United States Patent
Hatoh et al.

(10) Patent No.: US 6,869,719 B2
(45) Date of Patent: Mar. 22, 2005

(54) POLYMER ELECTROLYTE FUEL CELL STACK

(75) Inventors: Kazuhito Hatoh, Daito (JP); Eiichi Yasumoto, Katano (JP); Kazufumi Nishida, Moriguchi (JP); Hisaaki Gyoten, Shijonawate (JP); Teruhisa Kanbara, Ikeda (JP); Hideo Ohara, Kadoma (JP); Makoto Uchida, Hirakata (JP); Yasushi Sugawara, Neyagawa (JP); Toshihiro Matsumoto, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/330,886

(22) Filed: Dec. 27, 2002

(65) Prior Publication Data

US 2003/0134173 A1 Jul. 17, 2003

Related U.S. Application Data

(63) Continuation of application No. 09/497,058, filed on Feb. 2, 2000, now Pat. No. 6,531,236, which is a continuation of application No. PCT/JP99/02832, filed on May 27, 1999.

(30) Foreign Application Priority Data

Jun. 2, 1998 (JP) .......................... 10-152470
Aug. 20, 1998 (JP) .......................... 10-234748

(51) Int. Cl.[7] .............................. H01M 8/02
(52) U.S. Cl. ...................... 429/35; 429/38; 429/39
(58) Field of Search .................... 429/32, 35, 38, 429/39

(56) References Cited

U.S. PATENT DOCUMENTS 5,110,691 A * 5/1992 Krasij et al. .................. 429/35
5,219,674 A 6/1993 Singelyn et al.
5,284,718 A 2/1994 Chow et al.

(List continued on next page.)

FOREIGN PATENT DOCUMENTS

| JP | 55-059655 A | 5/1980 |
| JP | 64-007468 A | 1/1989 |
| JP | 1-183071 A | 7/1989 |

(List continued on next page.)

OTHER PUBLICATIONS

Kaneka Corp., "Isobutylene liquid resin has been first commercialized by living cation polymerization", *Industrial Material*, pp. 86–88, Sep. 1, 1997.

*Primary Examiner*—Mark Ruthkosky
(74) *Attorney, Agent, or Firm*—Akin Gump Strauss Hauer & Feld, LLP

(57) ABSTRACT

A polymer electrolyte fuel cell stack that includes a cell laminate having a plurality of unit cells, which are laid one upon another and each of which includes a polymer electrolyte membrane, a pair of electrodes arranged across the polymer electrolyte membrane and having respective catalytic reaction layers, a separator having means for feeding a supply of fuel gas containing hydrogen gas to one of the electrodes, another separator having means for feeding a supply of oxidant gas to the other of the electrodes, and a manifold for feeding the supply of fuel gas or the supply of oxidant gas to the respective electrode and disposed on a side face of each unit cell. In the polymer electrolyte fuel cell stack, a sealing portion is disposed at least in the vicinity of each electrode. The polymer electrolyte fuel cell stack has excellent durability and productivity. Gasket sealing portions, a sealing portion for cooling water, and sealing portions for water and gas in an internal humidifying unit are composed of a polymer compound that has polyisobutylene as the backbone structure. This arrangement ensures high reliability.

9 Claims, 16 Drawing Sheets

U.S. PATENT DOCUMENTS

| | | | |
|---|---|---|---|
| 5,665,823 A | 9/1997 | Saxena | |
| 5,705,294 A | 1/1998 | Lake | |
| 5,879,826 A | 3/1999 | Lehman | |
| 6,080,503 A * | 6/2000 | Schmid et al. | 429/35 |
| 6,128,179 A | 10/2000 | Morokuma | |
| 6,187,466 B1 | 2/2001 | Schroll | |
| 6,198,622 B1 | 3/2001 | Nitta | |
| 6,231,053 B1 | 5/2001 | Wakamatsu | |
| 6,262,879 B1 | 7/2001 | Nitta | |
| 6,372,373 B1 * | 4/2002 | Gyoten et al. | 429/35 |
| 6,451,468 B1 * | 9/2002 | Adachi | 429/35 |
| 2001/0055708 A1 * | 12/2001 | Krasji et al. | 429/32 |

FOREIGN PATENT DOCUMENTS

| | | | | |
|---|---|---|---|---|
| JP | 04-012465 A | 1/1992 | | |
| JP | 5-283093 A | 10/1993 | | |
| JP | 06-049364 A | 2/1994 | | |
| JP | 8-41138 A | 2/1996 | | |
| JP | 08-127683 A | 5/1996 | | |
| JP | 08-130028 A | 5/1996 | | |
| JP | 08-134165 A | 5/1996 | | |
| JP | 08-148170 A | 6/1996 | | |
| JP | 8-162143 A | 6/1996 | | |
| JP | 08-339814 A | 12/1996 | | |
| JP | 09-007621 A * | 1/1997 | | H01M/8/02 |
| JP | 9-55218 A | 2/1997 | | |
| JP | 09-031125 A | 2/1997 | | |
| JP | 9-106792 A | 4/1997 | | |
| JP | 9-289029 A | 11/1997 | | |
| JP | 10-55813 A | 2/1998 | | |
| JP | 10-87957 A | 4/1998 | | |
| WO | WO 00/35038 | * | 6/2000 | H01M/8/02 |

* cited by examiner

F I G. 1
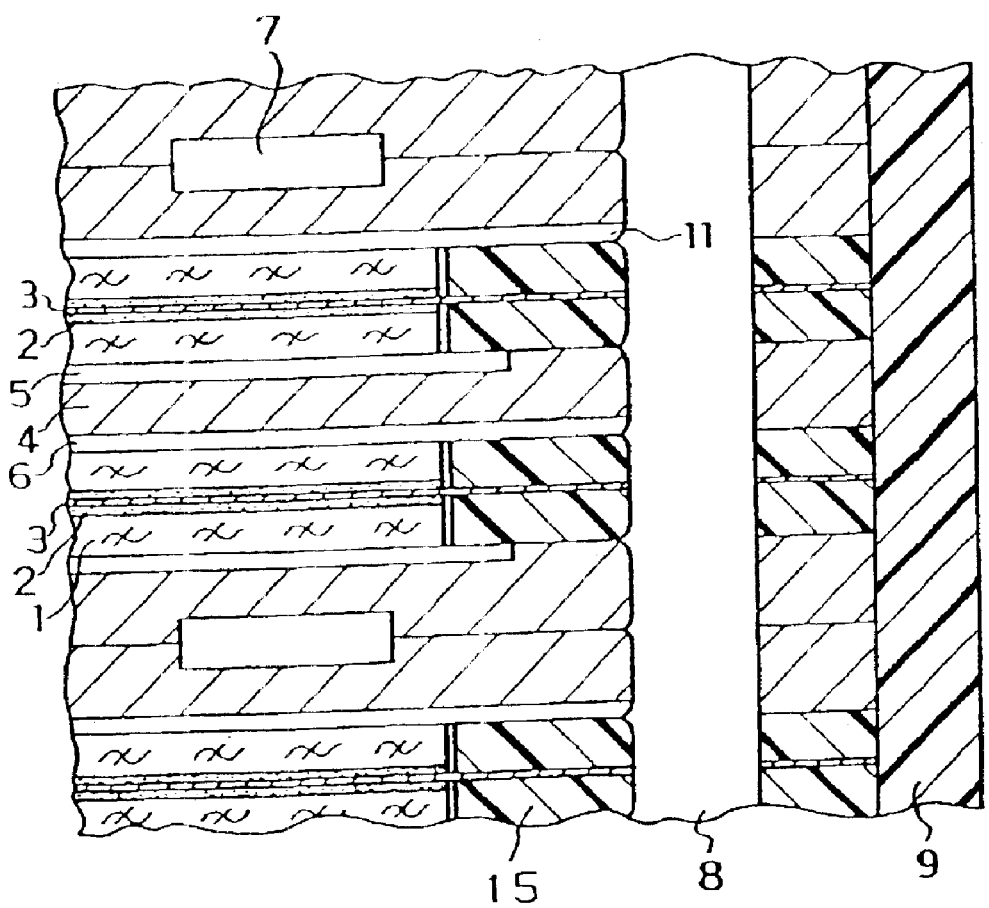

F I G. 9
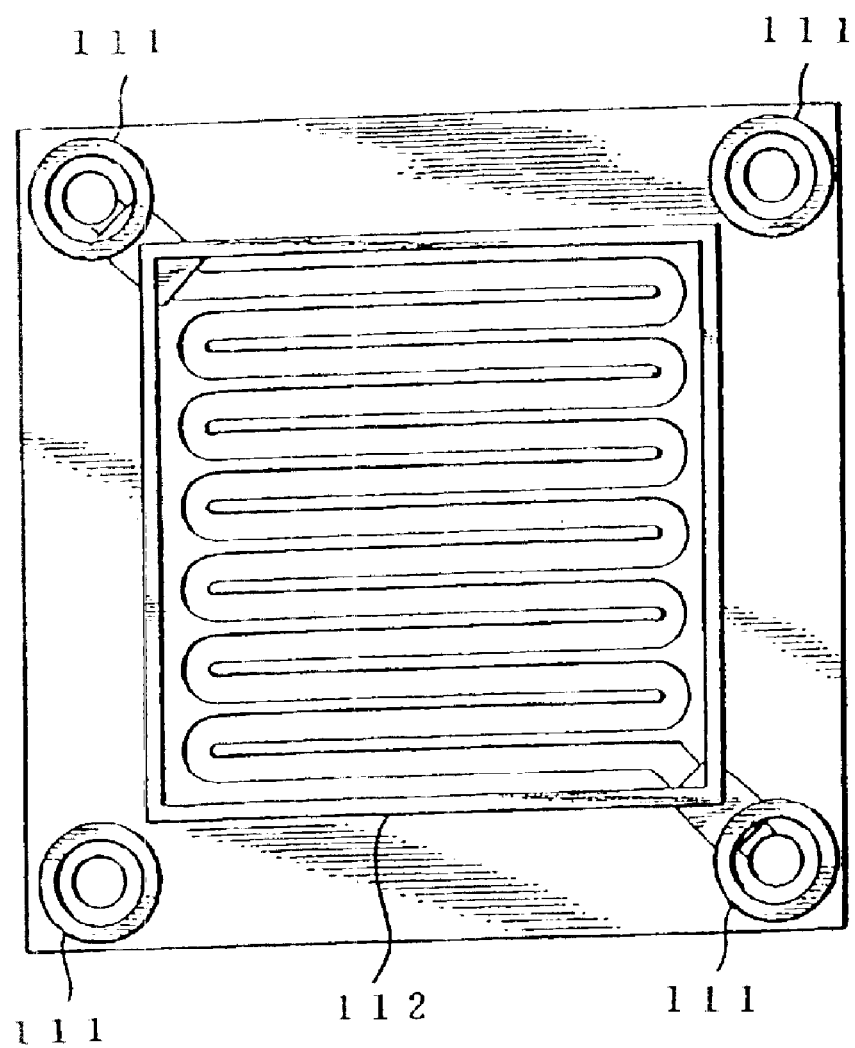

F I G. 1 3
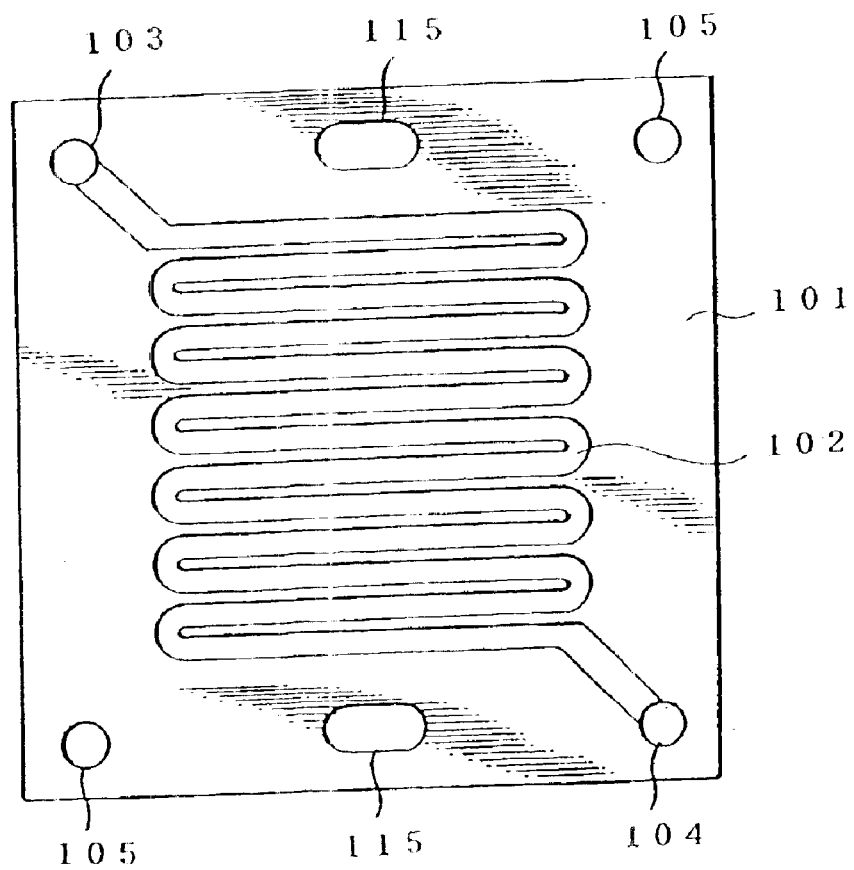

POLYMER ELECTROLYTE FUEL CELL STACK

CROSS REFERENCE TO RELATED APPLICATIONS

This is a continuation of U.S. patent application Ser. No. 09/497,058, filed Feb. 2, 2000 now U.S. Pat. No. 6,531,236, which is a continuation of PCT/JP99/02832, filed May 27, 1999, the disclosures of which are incorporated herein by reference.

BACKGROUND OF THE INVENTION

The present invention relates to a polymer electrolyte fuel cell stack that works at ordinary temperature and is used for portable power sources, electric vehicle power sources, and domestic cogeneration systems.

The polymer electrolyte fuel cell generates electricity and heat simultaneously by reacting a fuel, such as hydrogen, and an oxidant gas, such as air, electrochemically at gas diffusion electrodes with a catalyst like platinum carried thereon.

One example of the polymer electrolyte fuel cell stack is shown in the partially omitted perspective view of FIG. 4.

On the opposite faces of a polymer electrolyte membrane 3, which selectively transports hydrogen ions, catalytic reaction layers 2, which are comprised of carbon powder with a platinum metal catalyst carried thereon, are closely formed. Additionally, if required, a fluorocarbon water repellent may be added.

The polymer electrolyte used here may be a fluorocarbon polymer with sulfonate groups introduced on the ends of their side chains. This electrolyte has proton conductivity in the wet state. In order to activate the fuel cell, it is accordingly required to keep the polymer electrolyte in the wet state. The polymer electrolyte in the wet state has strong acidity due to H+ dissociated from the sulfonate groups at the ends. Accordingly, sufficient acid resistance is required for materials that are in direct contact with the electrolyte. The materials equivalent to the electrolyte materials are also admixed to the reaction electrodes, so that acid resistance is also required for materials that are in direct contact with the reaction electrodes.

Further, on the respective outer faces of the catalytic reaction layers 2A, a pair of diffusion layers 1 having both gas permeability and electrical conductivity are closely formed. This catalytic reaction layer 2 and the diffusion layer 1 constitute an electrode (either an anode or a cathode).

In the case where pure hydrogen is used as the fuel, the same material can be used as the material for the anode and cathode. In the case where the fuel is a gas mainly containing hydrogen, which is obtained by reforming a hydrocarbon fuel, carbon monoxide is naturally contained in the reformed gas. In order to prevent the noble metal catalyst from being poisoned with carbon monoxide, adding an anti-CO poisoning substance, such as ruthenium, to the anode side only has been proposed.

Outside of the electrode, conductive separator (bi-polar) plates 4 are further arranged so as to mechanically fix the assembly of these electrolyte membrane and the electrodes and connect adjoining assemblies electrically with each other in series. In a portion of the separator plate 4 that is in contact with the electrode, a gas flow path 5 is formed to feed the supply of the reaction gas to the surface of the electrode and to allow the gas evolved by the reaction and the remaining excess gas to flow out. Gas manifolds 8 supply a gas to and exhaust gas from the fuel cells, and water manifolds 14 supply water for cooling the fuel cell stack down and also exhaust the water. A cooling means such as a cooling plate may also be provided to the separator plate 4.

In order to prevent hydrogen gas and air from leaking from the cell laminate or from being undesirably mixed with each other, an internal sealing structure is generally employed, in which sealing portions or O-rings are disposed around the electrodes across the polymer electrolyte membrane.

Since the above-mentioned proton-conductive electrolyte has strong acidity, a fluorocarbon polymer material having high acid resistance is employed for gasket-like sealing portions that are in direct contact with the electrolyte.

With a view to maximizing the area of the electrodes, an external sealing structure, which does not use the sealing portions or O-rings around the electrodes but extends the ends of the electrodes to the side face of the cell laminate and seal the side face of the cell laminate with an air-tight non-conductive material may be adopted.

Polymer electrolyte fuel cell stacks with an external sealing structure are divided into an internal manifold type and an external manifold type. In the internal manifold type, the manifolds or gas flow paths for feeding a supply of gas to the respective unit cells are formed inside the cell laminate in the form of through apertures that pass through the constituents of the cell laminate such as separators. In the external manifold type, on the other hand, the manifolds are arranged outside the cell laminate.

In one prior art method, a solution obtained by dissolving a resin in a solvent is applied and dried, or a reactive resin is applied and solidified, in order to form the gas seal portion that covers the side face of the cell laminate. However, sufficient gas sealing may not be obtained.

When the manifolds which connect with gas inlets and outlets are provided, the significant unevenness on the surface of the gas seal formed by the resin makes it difficult to ensure favorable gas sealing at a portion where the side face of the cell laminate is in contact with the manifold.

One method of sealing involves casting a thermosetting resin such as an epoxy resin into a cast mold which envelopes the cell laminate to integrally mold it, but solidification of the resin is time-consuming resulting in poor manufacturing productivity.

The above methods have another problem in that the gas inlets and outlets may be closed by the air-tight non-conductive material.

Around the electrodes, gasket-like sealing portions like gaskets are disposed and sandwiched between a pair of separator plates in order to prevent the reaction gases fed to the cathode and the anode from being leaked. One prior art technique arranges hard gaskets composed of, for example, a fluorocarbon resin, around the peripheral portion of the electrodes and subsequently places a pair of separator plates across the gaskets, but this requires accurate adjustment of the thickness of the electrodes and the gaskets.

When the gaskets have rubber-like elasticity, however, strict size accuracy is not required, though better functioning of the gaskets can be obtained by a certain level of adjustment of the thickness. Accordingly, the gaskets should have suitable acid resistance and rubber-like elasticity. Although having poorer acid resistance than fluorocarbon resin, ethylene-propylene-diene rubber (EPDM), which has suitable elasticity, is sometimes used for the material of the gaskets.

The separator plates are directly in contact with the electrodes and are thus required to have high gas tightness and electrical conductivity, as well as acid resistance. When air is used as the oxidant gas, it is necessary to enhance the flow rate of the air supplied to the cathode and to efficiently remove liquid water or water vapor produced at the cathode. A complicated structure generally called a serpentine-type structure, as shown in FIG. 5, is typically used for the gas flow path structure in the separator plate. The separator plate is obtained by cutting a carbon material such as a dense carbon plate having gas tightness, a carbon plate impregnated with a resin, or glassy carbon to a desired shape and forming grooves for gas flow paths. In another example, the separator may be obtained by processing and plating a corrosion-resistant alloy plate with a noble metal.

Also, the carbon material or the corrosion-resistant metal material may be used only for the portions that are in contact with the electrodes and require sufficient electrical conductivity. It has been proposed that separator plates of a resin-containing composite material be used for peripheral portions, such as manifolds, which do not require electrical conductivity. Also, it has been suggested that a resin be mixed with carbon powder or metal power and press-molded or injection-molded and used for the separator plates.

However, the fluorocarbon material employed for the gasket-like sealing portions is expensive. Additionally, the fluorocarbon material is generally a very hard resin and requires an extremely large load to clamp the gaskets and sufficiently seal the flow of gas or cooling water. Therefore, there have been attempts to use porous fluorocarbon material or to apply fluorocarbon paste on the separator plates, which are used in dry or half dry state. However, the porous fluorocarbon material is expensive. Additionally, when a load is for clamping which gives sufficient sealing properties is applied, this load may damage the porous fluorocarbon material.

Fluorocarbon paste used for the sealing portions is also high in material cost. Further, when dried and cured, its hardness makes it difficult to regulate its thickness at the time of the application. A rubber material like EPDM does not have as a high acid resistance as the fluorocarbon resin and is thus not suitable for long-term use. Additionally, EPDM generally exhibits thermoplasticity such that it is deformed over time at typical cell-driving temperatures, generally about 80° C. In some cases, the deformation blocks the gas flow path and lowers the supply of the fuel.

With respect to the material for the separator plates, in the case where dense carbon plate having gas tightness or glassy carbon is employed for the separator plates, cutting work is required to form the gas flow paths. This negatively affects mass production and manufacturing cost. In the case where carbon plate impregnated with a resin is used for the separator plates, impregnation of the resin after formation of gas flow paths causes warping of the carbon plate because of the low elasticity of the resin. Post treatment, including cutting the gas flow paths, should accordingly occur after impregnation of the resin. When a phenol resin or a silicone resin is used as the impregnating material, sufficient acid resistance cannot be obtained. In the case where a corrosion-resistant alloy or material plated with a noble metal is used, cutting work is required to form the serpentine flow path structure.

In the case where the mixture of a resin and carbon powder or metal powder is press-molded or injection-molded into separator plates, the resin itself is required to have acid resistance. Fluorocarbon resin or other hard resin materials have low fluidity and are difficult to mold. Because the resin has poor fluidity, only a small amount of the resin is mixed in the mixture. In this case, post treatment, for example, impregnating the portions that require the gas tightness with the resin, is required after molding. This results in a complicated structure.

The object of the present invention is thus to provide a polymer electrolyte fuel cell stack having seals of excellent durability. Another object of the present invention is to provide a method of manufacturing such a polymer electrolyte fuel cell stack with a high productivity.

BRIEF SUMMARY OF THE INVENTION

The present invention relates to a polymer electrolyte fuel cell stack (hereinafter simply referred to as PEFC) comprising a cell laminate having a plurality of unit cells, which are laid one upon another, and each of which includes a polymer electrolyte membrane, a pair of electrodes that are arranged across the polymer electrolyte membrane and respectively have a catalytic reaction layer, a separator having means for feeding a supply of fuel gas containing hydrogen to one of the electrodes, and another separator having means for feeding a supply of oxidant gas to the other of the electrodes, wherein a sealing portion is disposed at least in the vicinity of each electrode.

It is preferable to have the sealing portion over a whole side face of the unit cells. It is also preferable that the separator has cooling means with a sealing portion. It is preferable to have the sealing portion around each electrode or in a space formed in the vicinity of each electrode between the separators. It is preferable to have a humidifying unit that enables heat exchange between a flow of cooling water discharged from the polymer electrolyte fuel cell stack and a flow of fuel gas fed to the polymer electrolyte fuel cell stack and simultaneously carries out heating and humidifying, the humidifying unit having a sealing portion.

Also, it is preferable that the sealing portion is composed of a polymer compound expressed by Formula (1) given below:

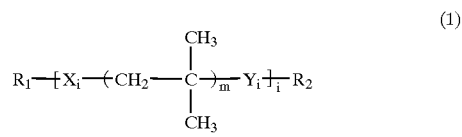

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and i is an integer of not less than 1 and represents the degree of polymerization.

Further, it is preferable that the sealing portion is composed of a mixture of the polymer compound expressed by Formula (1) given above and an electron-conductive material.

In addition, it is preferable that the separator is composed of a carbon material or a metal material and a polymer compound expressed by Formula (1) given below:

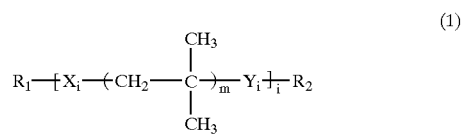

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and i is an integer of not less than 1 and represents the degree of polymerization.

Also, it is preferable that the polymerizable functional groups $X_i$ and $Y_i$ in Formula (1) given above are independently selected from the group consisting of allyl groups, acryloyl groups, methacryloyl groups, isocyanate groups, and epoxy groups.

It is also preferable that the number of repeated isobutylene oligomer units m in Formula (1) given above ranges from 56 to 72.

It is further preferable that the degree of polymerization i of the polymer compound in Formula (1) given above is not less than 8,000.

Also, it is preferable that at least a portion of the sealing portion is formed by injection molding a non-conductive gas-tight material.

Further, it is preferable that at least portion of the sealing portion consists of plural layers, and an outer-most layer thereof is formed by injection molding.

Also, it is preferable that a manifold for feeding the supply of fuel gas or the supply of oxidant gas to each of the electrodes is disposed on a side face of the cell laminate.

It is also preferable that the sealing portion has a three-layered structure, where a heat-resistant hard resin layer is interposed between a pair of elastic resin layers.

It is preferable that the heat-resistant hard resin layer comprises a polyethylene terephthalate resin and the elastic resin layer is comprises by a polymer compound expressed by Formula (1) given below:

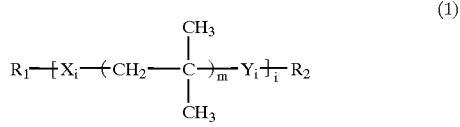
(1)

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and is an integer of not less than 1 and represents the degree of polymerization.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 is a sectional view schematically illustrating a main portion of a PEFC in Example 1 of the present invention.

FIG. 9 is a top view schematically illustrating the structure of the separator plate used in Example 9 of the present invention.

FIG. 13 is a top view schematically illustrating the structure of a separator plate used in Example 11 of the present invention.

DETAILED DESCRIPTION OF THE INVENTION

Figure 2:
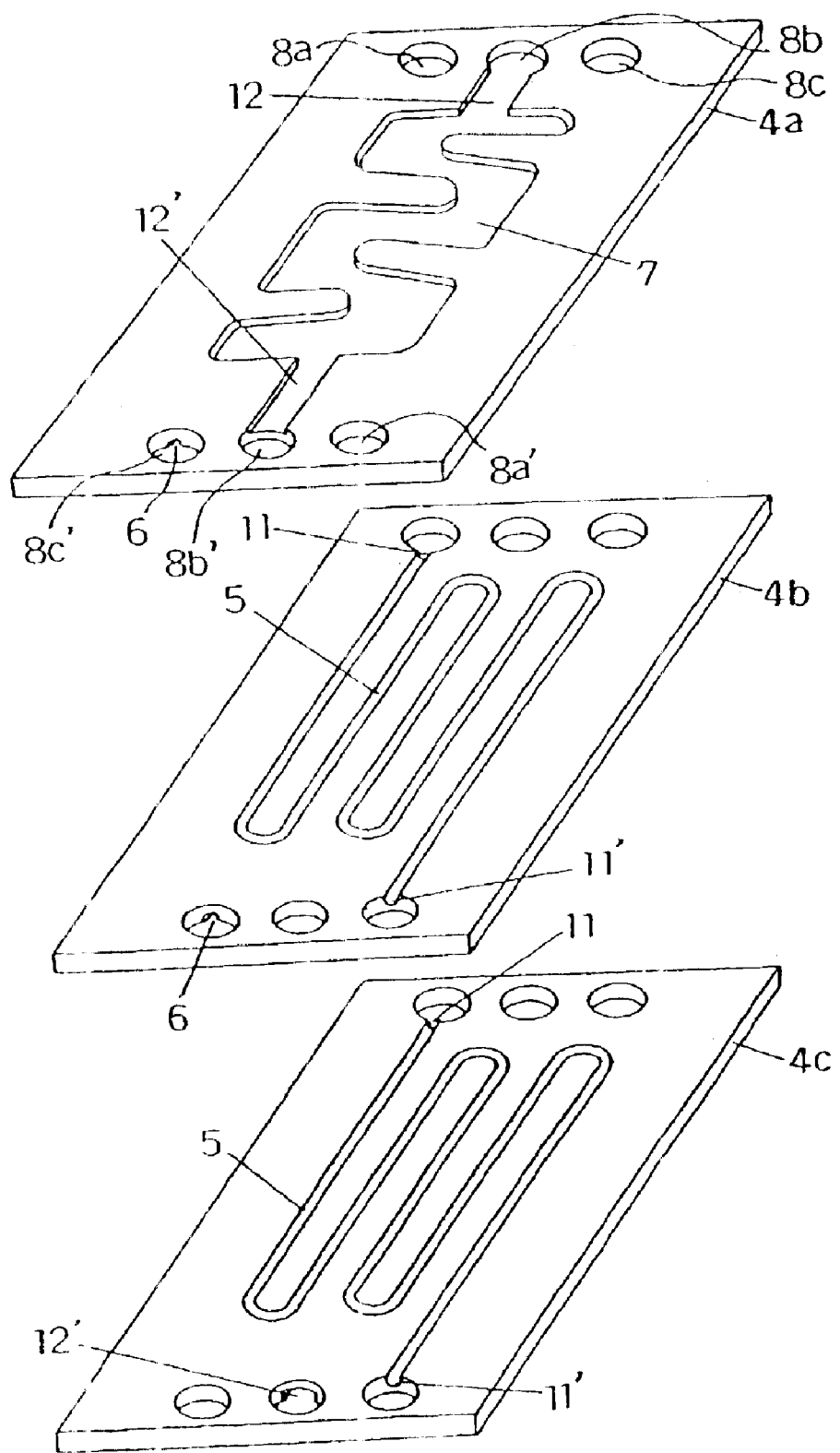
FIG. 2 is a perspective view illustrating separator plates used in the PEFC of FIG. 1.

The following is a detailed description of preferred embodiments of the invention and should not be considered limiting.

The present invention is characterized in that a sealing portion is provided at each constituent of a PEFC, in order to prevent gas and water from leaking mainly from electrodes included in the PEFC.

The present invention accordingly relates to a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, a separator having means for feeding a supply of fuel gas containing hydrogen to one of the electrodes, and another separator having means for feeding a supply of oxidant gas to the other of the electrodes, a sealing portion is provided at least in the periphery of each electrode.

First Embodiment

The present invention provides a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding and distributing a supply of fuel gas containing hydrogen to one of the electrodes, and means for feeding and distributing a supply of oxidant gas to the other of the electrodes, wherein a sealing portion is formed by covering a side face of the cell laminate with a non-conductive gas-tight material.

It is preferable that at least portion of the sealing portion is formed by injection molding a non-conductive, gas-tight material or that at least portion of the sealing portion consists of plural layers and an outer-most layer thereof is formed by injection molding.

It is further preferable that a manifold is disposed on the side face of the cell laminate to feed the supply of fuel gas or the supply of oxidant gas to each of the electrodes included in the unit cell.

The present invention also provides a method of manufacturing such a PEFC. The present invention is accordingly directed to a method of manufacturing a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding a supply of fuel gas to one of the electrodes, and means for feeding a supply of oxidant gas to the other of the electrodes comprising the steps of: laying a plurality of unit cells one upon another and mechanically clamping and fixing the layered unit cells from both end faces thereof to obtain a cell laminate; and forming a sealing portion, which comprises a non-conductive gas-tight material, on a side face of the cell laminate, wherein the step of forming the sealing portion includes the step of injection-molding an outer circumference of the cell laminate.

Prior to the step of forming the sealing portion, the step of disposing a manifold in the side face of the cell laminate may be included.

The present invention also provides a method of manufacturing a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding and distributing a supply of fuel gas to one of the electrodes, and means for feeding and distributing a supply of oxidant gas to the other of the electrodes, comprising the step of applying a liquid precursor of a non-conductive gas-tight material on an inner surface of a manifold and making the material dried and solidified to form a sealing portion inside the manifold, while preventing gas inlet and outlet of each unit cell open to the manifold from being blocked by the solidified non-conductive gas-tight material.

In this case, the step of forming the sealing portion inside the manifold may include the steps of: arranging a porous film at the gas inlet and outlet, prior to the application of the liquid precursor; and removing the porous film after the solidification of the liquid precursor.

It is preferable that the step of forming the sealing portion is carried out while the supplies of gases continuously flow to the means for distributing the respective gases to the electrodes.

In the PEFC of the first embodiment according to the present invention, it is preferable that the sealing portion is integrally formed by applying a mechanically strong resin such as an engineering plastic, on the side face of the cell laminate, because such arrangement can provide the PEFC having excellent gas tightness and mechanical strength. This also gives a smooth outer surface, which leads to a favorable appearance and, facilitates formation of the sealing portion.

If the sealing portion consists of plural layers, which include an outer-most resin layer formed by injection molding, it further improves the durability of the sealing portion.

For example, the sealing portion comprising a layer composed of a cushioning material that absorbs mechanical shocks can improve the shock resistance of the fuel cell stack.

Since the method of manufacturing the PEFC according to the present invention includes the step of forming the sealing portion by injection-molding the non-conductive gas-tight material, a fuel cell stack having excellent mechanical properties can be manufactured within a short time period.

Also, if the step of arranging a manifold on the side face of the cell laminate is included, prior to the formation of the sealing portion, the sealing portion and the side face of the cell laminate can be preferably formed integrally. Further, the process of fixing the manifold can be omitted.

It is preferable that the method of manufacturing the PEFC according to the present invention includes the step of applying a liquid precursor of a non-conductive gas-tight material on an inner surface of a manifold and drying and solidifying the material, so as to form a sealing portion inside the manifold, while preventing the gas inlet and outlet of each unit cell open to the manifold from being blocked by the solidified non-conductive gas-tight material. This arrangement assures the inlet and outlet of gas to and from each unit cell.

In order to form the sealing portion while preventing the gas inlet and outlet from being blocked by the sealing portion, it is preferable to arrange a porous film at the gas inlet and outlet open to the manifold, to make a liquid resin precursor penetrate into the film and enter the clearances of the electrodes and separators, and to solidify the liquid resin material, so as to form the sealing portion.

In this case, due to the surface tension of the liquid precursor, the liquid precursor penetrates into the film not to a level that blocks the fluid inlet and outlet but to a level that enters only the clearances of the electrodes and the separators that are in direct contact and is solidified. Therefore, the inlet and outlet of fluid can be ensured by removing the film after the solidification of the liquid precursor.

It is preferable that the sealing portion is formed inside the manifold by applying and drying the resin precursor while the supplies of gases are continuously flown to the means for distributing the respective gases to the electrodes. Application of the resin precursor under the continuous flow of the gas effectively prevents the resin precursor from entering the fluid inlet and outlet, and the fluid inlet and outlet are not blocked when the sealing portion is solidified.

In addition to the above-mentioned methods, there is a method wherein the sealing portion is formed after the fluid inlet and outlet are blocked previously with a solid substance. In this case, the solid substance is removed from the fluid inlet and outlet after the formation of the sealing portion to ensure the gas inlet and outlet.

As the non-conductive gas-tight material, a phenol resin or the like may be employed which becomes the sealing agent when solidified.

As the resin material, a liquid-crystal polymer or the like may be used.

Second Embodiment

The second embodiment of the present invention is a PEFC, in which a pair of electrodes arranged across a polymer electrolyte membrane is interposed between a pair of separator plates that supply and discharge a fuel gas to and from one of the electrodes, and a cooling jig is attached to the separator plate, wherein a sealing portion is arranged around each of the electrodes to prevent the fuel gas and water produced at the electrodes from leaking outside the fuel cell stack., and comprises a polymer compound having polyisobutylene as a backbone structure expressed by Formula (1) given below:

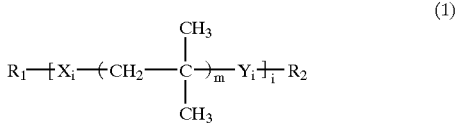

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and i is an integer of not less than 1 and represents the degree of polymerization.

It is preferable that the cooling jig has a sealing portion, which is constituted by the polymer compound expressed by Formula (1) given above to prevent the coolant passing through the cooling jig from leaking outside the fuel cell stack.

The sealing portion may be composed of a mixture of the polymer compound expressed by Formula (1) given above and an electron conductive material.

Further, in the PEFC of the present invention a sealing portion composed of the polymer compound expressed by Formula (1) given above is arranged in a clearance in the periphery of the electrodes between the pair of separator plates or in the periphery of the electrodes between the pair of separator plates to prevent the fuel gas and water produced at the electrode from leaking outside the fuel cell stack.

It is preferable that the separator plates comprise a mixture of a carbon material or a metal material and the polymer compound expressed by Formula (1) given above.

Also, by providing a humidifying unit that performs heat exchange between a flow of cooling water discharged from the PEFC and a flow of fuel gas fed to the PEFC and simultaneously carries out heating and humidifying and by including a sealing portion constituted by the polymer compound expressed by Formula (1) given above, the cooling water and the fuel gas may be prevented from leaking outside the fuel cell stack.

It is preferable that the polymerizable functional group in Formula (1) given above is an allyl group, an acryloyl group, a methacryloyl group, an isocyanate group, or an epoxy group.

It is also preferable that the number of repeated isobutylene oligomer units m in Formula (1) given above ranges from 56 to 72. It is further preferable that the degree of polymerization i of the polymer compound in Formula (1) given above is not less than 8,000.

The sealing portion composed of the polymer compound expressed by Formula (1) given above is preferably formed by applying a solution containing at least one reactive oligomer represented by Formula (2):

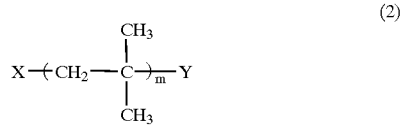

on a place to be sealed and curing the reactive oligomer by copolymerization.

Further, according to the present invention, the sealing portions preferably have a three-layered structure in which a heat-resistant hard resin layer is interposed between elastic resin layers and may be arranged around the electrodes or in the cooling jig to prevent the fuel gas and the coolant passing through the cooling jig from leaking outside the fuel cell stack.

In this arrangement, it is preferable that the center layer of the sealing portion having the three-layered structure comprises a polyethylene terephthalate resin and the outer layers arranged across this are composed of the polymer compound expressed by Formula (1) given above.

In the PEFC of the second embodiment according to the present invention, the sealing portions for the electrodes, the sealing portion for cooling water and/or the sealing portions for water and gas in the internal humidifying unit are composed of the polymer compound having polyisobutylene as the backbone structure expressed by Formula (1) given above, thereby enabling the formation of a sealing portion having acid resistance at a low cost.

By this method, the PEFC can be manufactured at a low cost by applying a solution containing at least the reactive oligomer expressed by Formula (2) given above on a place to be sealed and, then, copolymerizing and curing the reactive oligomer.

The polymer compound represented by Formula (1) above is excellent in acid resistance, inexpensive and has the desired amount of elasticity and heat resistance. This is an improvement over the fluorocarbon resin or EPDM traditionally used for the gaskets and the sealing material of the cooling water.

When a carbon plate impregnated with the polymer compound expressed by Formula (1) given above is used as the separator plate, the impregnation of the resin may be carried out after the formation of gas flow path in the non-dense carbon plate, because of the elasticity of the resin. Since the non-dense carbon plate is more resilient and easily processed before impregnation with the resin than the carbon plate impregnated with the resin, processing is significantly facilitated.

Further, when carbon powder or metal powder is mixed with the polymer compound expressed by Formula (1) given above and press-molded or injection-molded, the fluidity in molding can be improved because of the elasticity of the resin.

Even when the content of the resin increases, the fluidity in molding is maintained and, therefore, the step of post treatment after molding can be omitted.

Also, when carbon or a metal is used only for the portion that requires electrical conductivity inside the separator plate, and the polymer compound expressed by Formula (1) given above is used for the periphery of parts of the cell laminate having a complicated shape, like a manifold, and for the sealing portion that does not require electrical conductivity, the rubber-like flexibility of the polymer compound facilitates sealing.

Even if the carbon or metal material used for the portion that requires electrical conductivity and the polymer compound expressed by Formula (1) given above and used for the portion that does not require the electrical conductivity have different coefficients of thermal expansion, there is no damage to the separator plate in the course of heating or cooling the fuel cell stack due to the difference between the coefficients of thermal expansion because of the rubber-like flexibility.

In the above description, the polymer expressed by Formula (1) is obtained by crosslinking a plurality of units at end functional groups portions, where each unit includes the repeated number m of isobutylene oligomers and the end functional groups X and Y added. When an allyl group, acryloyl group, methacryloyl group, isocyanate group, or an epoxy group is used for X and Y, the resulting polymer that is polymerized at the crosslinking points of X and Y has a network structure crosslinked in matrices when functional groups are the polyfunctional groups.

At that point, the physical properties of the polymer are significantly affected by the number of repeated isobutylene oligomer units m, the degree of polymerization i, and the end functional groups in the polymer compound expressed by Formula (1) given above.

The present inventors have found, as a result of intensive studies, that the favorable number of repeated isobutylene oligomer units m ranges from 56 to 72 in the polymer compound used for the sealing portions in the PEFC. It is also found that the repeated number m is preferably 64 on average, and the degree of polymerization i is not less than 8,000.

The invention will now be described with respect to the following non-limiting examples.

EXAMPLE 1

Carbon powder having a particle diameter of not greater than several microns was soaked in an aqueous solution of chloroplatinic acid and a platinum catalyst was carried on the surface of the carbon powder by reduction. The weight ratio of carbon to platinum carried thereon was 1:1. Then, the carbon powder with the platinum catalyst carried thereon was dispersed in an alcohol solution of a polymer electrolyte to yield a slurry.

Carbon paper having a thickness of 400 $\mu$m, which was the material of electrodes, was impregnated with an aqueous dispersion of a fluorocarbon resin (Neoflon ND-1 manufactured by Daikin Industries Co., Ltd.) and dried and then heated at 400° C. for 30 minutes to give the water repellency.

As shown in FIG. 1, the slurry containing the carbon powder was applied uniformly on a single face of the water-repelled carbon paper to form a catalytic layer 2.

The obtained carbon paper electrode 1 was cut into a size of 10 by 10 cm, while the polymer electrolyte membrane 3 was cut into the size of 12 by 12 cm. A pair of the carbon paper electrodes 1 was laid across the polymer electrolyte membrane 3 in such a manner that the respective catalytic layers 2 of the electrodes 1 were in contact with the polymer electrolyte membrane 3 and dried to yield an electrolyte membrane-electrode assembly (hereinafter referred to as "MEA").

Then the MEA thus obtained was interposed between a pair of carbon separator plates 4 having air-tightness to assemble a unit cell. The thickness of each separator plate 4 was 4 mm.

In the process of interposing the MEA between the pair of separator plates, polyethylene terephthalate (PET) sheets 15, which had the same outer dimensions as those of the carbon separator plates, were arranged around the electrodes. The PET sheets are hard and are not used for sealing, but are used as spacers between the carbon separator plates and the electrolyte membrane.

Two unit cells were laid one upon the other to construct a unit cell laminate. In this example, no O rings were used for sealing the cooling unit.

The separators included in the unit cell laminate are shown in FIG. 2. The separators used here include a separator plate 4a having a cooling water flow path 7 formed in one face and a gas flow path 6 formed in the other face, a separator plate 4b having a gas flow path 5 formed in one face and the gas flow path 6 formed in the other face, and a separator 4c having the gas flow path 5 formed in one face and the cooling water flow path 7 formed in the other face. An inlet 11 and an outlet 11' of the gas flow path 5, an inlet and an outlet of the gas flow path 6, and an inlet 12 and an outlet 12' of the cooling water flow path 7 are formed on opposite sides.

The gas flow paths 5 and 6 and the cooling water flow path 7 were formed on the surface of the separator by cutting. For example, the gas flow path 5 of this example was formed by cutting a groove of 2 mm in width and 1 mm in depth on the surface of the separator in a shape shown in FIG. 2.

Manifold apertures 8a and 8a' communicating with the gas flow path 5, manifold apertures 8c and 8c' communicating with the gas flow path 6, and manifold apertures 8b and 8b' communicating with the cooling water flow path 7 were formed in the circumferential portion of the separator plates. Lamination of unit cells causes, for example, the manifold apertures 8c to be aligned and form a manifold 8 of the cell laminate. This is true for the other manifold apertures. The supply and discharge of each fluid flows through each manifold.

By laying 50 unit cells one upon another, placing respective pairs of metal collector plates, insulator plates composed of an electrical insulating material, and end plates in this sequence on both ends of the stack of 50 unit cells, and clamping the end plates with nuts and bolts piercing the plates, a cell laminate (PEFC) was manufactured. The clamping pressure was 10 kgf/cm$^2$ per area of the separator.

Subsequently, a phenol resin solution was charged into the manifold apertures, which were aligned in the cell laminate, from an opening of the manifold 8 located in the end plate, so as to apply the inner surface of the manifold apertures 8 with the phenol resin and dry the phenol resin, thereby forming a sealing portion inside the manifold apertures 8, except at the gas inlet and outlet 11 to each unit cell. When the phenol resin solution charged has an excessively high viscosity or when the gas inlet and outlet 11 have excessively small bores, the phenol resin may block the gas inlet and outlet 11. The other manifolds were processed in this manner.

A mold having inner dimensions greater by 6 mm than the outer dimensions of the cell laminate was produced. A resin was injected into a space defined by the mold and stainless steel electrode end plates at an injection pressure of 100 to 1,000 kgf/cm$^2$ and a peak temperature of 300° C., so as to form a resin mold 9 integrally on the side face of the cell laminate. The resin used here was one of liquid-crystal polymers and sold under the name Zenite® HX6130 by E.I. du Pont de Nemours and Co. There were 2 to 32 openings for injection formed in the circumferential portion of the mold.

Excessively large injection pressure or excessively low temperature in the course of resin molding may cause damage or deformation to the resulting fuel cell stack. If the injection pressure is insufficient, on the other hand, the whole surface may not to be covered with the resin or insufficient gas sealing properties may result. Extremely high temperature allows the injection molding but lowers the performance of the resulting fuel cell stack. This is ascribed to denaturation of the electrodes due to heat.

The injection molding was performed with a variety of resins, such as nylon resin having a lower injection temperature than the above resin.

As shown in the results of the performance tests of the fuel cell stacks injection-molded in the above manner, the fuel cell stack manufactured under the optimized conditions of injection molding (that is, the injection pressure of 500 kgf/cm², the injection temperature of 200° C., the die temperature of 120° C.) had equivalent initial performance (0.65 V-0.6 A/cm²) to that of the prior art fuel cell stacks prepared by applying and drying only a phenol resin on the outer surface of the cell laminate.

The fuel cell stack injection-molded in the above manner was then subjected to a durability test. The fuel cell stack was kept in an environment of 80° C. and relative humidity of 90% and evaluated periodically. For the purpose of comparison, the prior art fuel cell stack prepared by applying and drying only a phenol resin on the outer surface of the cell laminate was also evaluated in the same manner.

As the result, while the prior art fuel cell stack had lowered performance after being left in the above environment for 150 hours, the fuel cell stack of the present invention did not have such lowered performance but showed excellent durability.

EXAMPLE 2

A cell laminate of this example was prepared in the same manner as Example 1. Then, after applying and drying butadiene rubber dissolved in a solvent on the outer surface of the cell laminate, a PEFC was manufactured in the same manner as Example 1. The PEFC was kept under vibrations for evaluation of the durability, and the cell performance after the vibration test was substantially the same as the cell performance before the vibration test. This may be due to the fact that butadiene rubber functions as a cushioning material against the mechanical stress.

COMPARATIVE EXAMPLE 1

The PEFC manufactured in Example 1 was kept under vibrations in the same manner as Example 2. The cell performance after the vibration test was lower than the cell performance before the vibration test. A peeling of the sealing surface was observed in the decomposed PEFC. It is likely that the gas was leaked therefrom.

EXAMPLE 3

Figure 3:
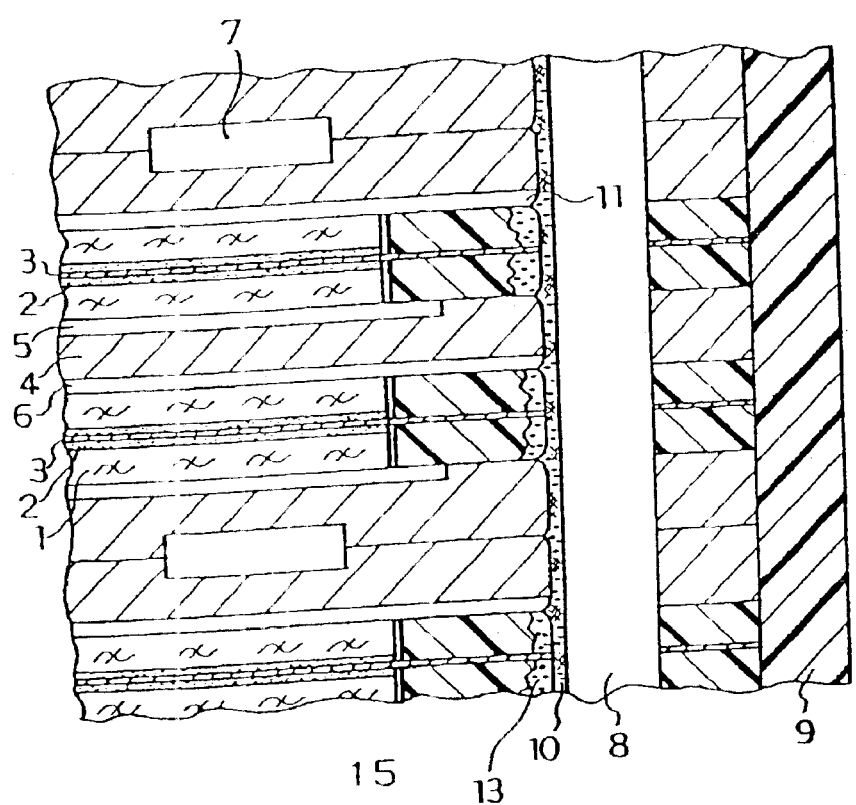
FIG. 3 is a sectional view schematically illustrating a main portion of a PEFC in Example 3 of the present invention.
Figure 4:
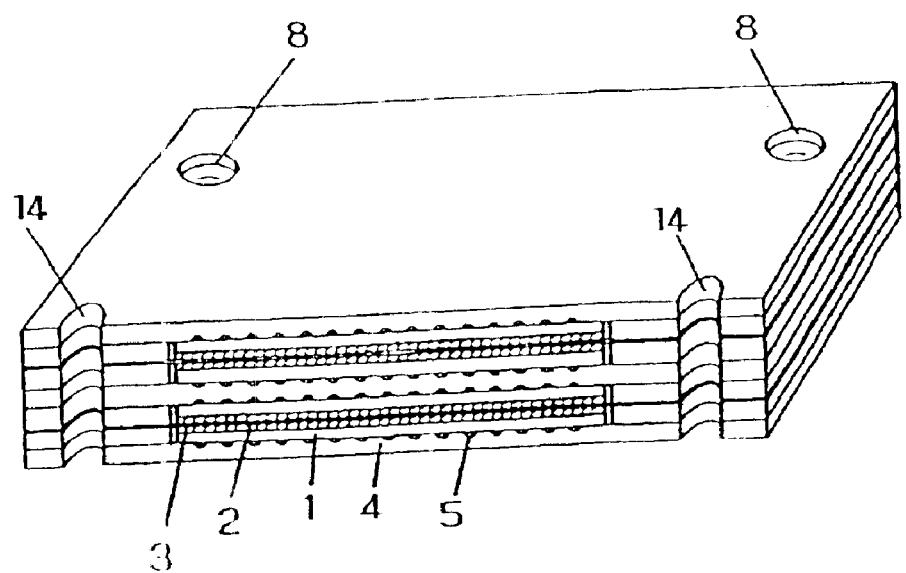
FIG. 4 is a perspective view schematically illustrating a PEFC of the present invention.

A cell laminate of this example was prepared in the same manner as Example 1 and a porous film 10, which was a glass fiber film, was attached on a wall face to which the gas inlet and outlet 11 of the manifold apertures 8 were open, as shown in FIG. 3. The porous film was attached inside the manifold apertures for the other fluids in the same manner.

Subsequently, a phenol resin solution, which was obtained by dissolving phenol resin powder in an organic solvent and adjusting the viscosity, was charged from an opening of the manifold placed in the end plate to penetrate into the porous film 10.

A phenol resin 13 passed through the porous film 10 and reached the side face of the cell laminate to enter the clearances of the electrodes and the separators. The porous film 10 was peeled off after the phenol resin 13 was dried and solidified. The solidified phenol resin 13 formed a gas seal inside the manifold. The gas inlet and outlet were not blocked by this resin.

EXAMPLE 4

A PEFC of this example was assembled by embedding Teflon spacers having identical cross sections to those of each fluid inlet and outlet at the inlet and outlet communicating with the manifold apertures of the respective unit cells in the process of laying 50 unit cells prepared in Example 1 one upon another. At that time, the end of the spacer was projected inside the manifold apertures. A gas sealing portion was prepared by applying and drying the phenol resin in the same manner as Example 3. By removing the Teflon spacers with a jig, the inlet and outlet of each fluid could be ensured.

EXAMPLE 5

A cell laminate of this example was prepared in the same manner as Example 1. While a gas was caused to continuously flow from the inlets of the gases and cooling water, the phenol resin was applied and dried on a specific face of the cell laminate with the outlets of the gases and cooling water. Thereafter, while the flow of the gas was reversed, that is, while the gas was continuously caused to flow from the respective outlets, the phenol resin was applied and dried on a specific face of the cell laminate with the inlets. As the result, the inlets and outlets of gases and cooling water was prevented from being blocked by the resin for gas sealing.

EXAMPLE 6

Acetylene black carbon powder with 25% by weight of platinum particles having an average particle diameter of about 30 angstroms carried thereon was used as a reaction catalyst for the electrodes. This catalyst powder was dispersed in isopropyl alcohol and then mixed with a dispersion, which was prepared by dispersing perfluorocarbon sulfonic acid powder represented by Formula (3)

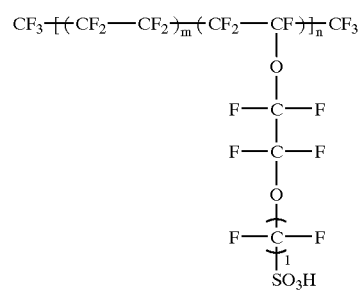

wherein l represents 1 or 2 and m=5 to 13.5, and n≈1,000 in ethyl alcohol to yield a paste. A catalyst reaction layer was formed on one face of carbon non-woven fabric (thickness of 250 μm) by means of a screen printing method with the paste as the raw material. Quantity control was carried out to make the quantity of platinum included in the resulting electrode equal to 0.5 mg/cm² and the quantity of perfluorocarbon sulfonic acid equal to 1.2 mg/cm².

Figure 5:
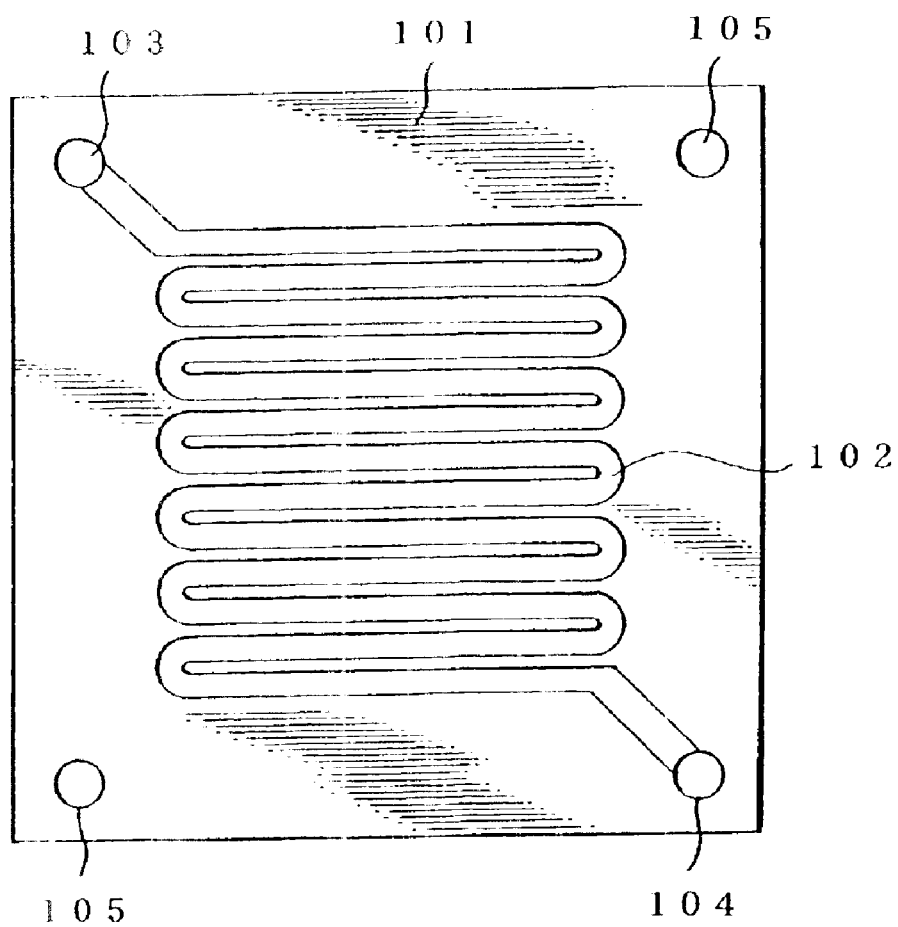
FIG. 5 is a top view schematically illustrating the structure of a separator plate used in Example 6 of the present invention.
Figure 6:
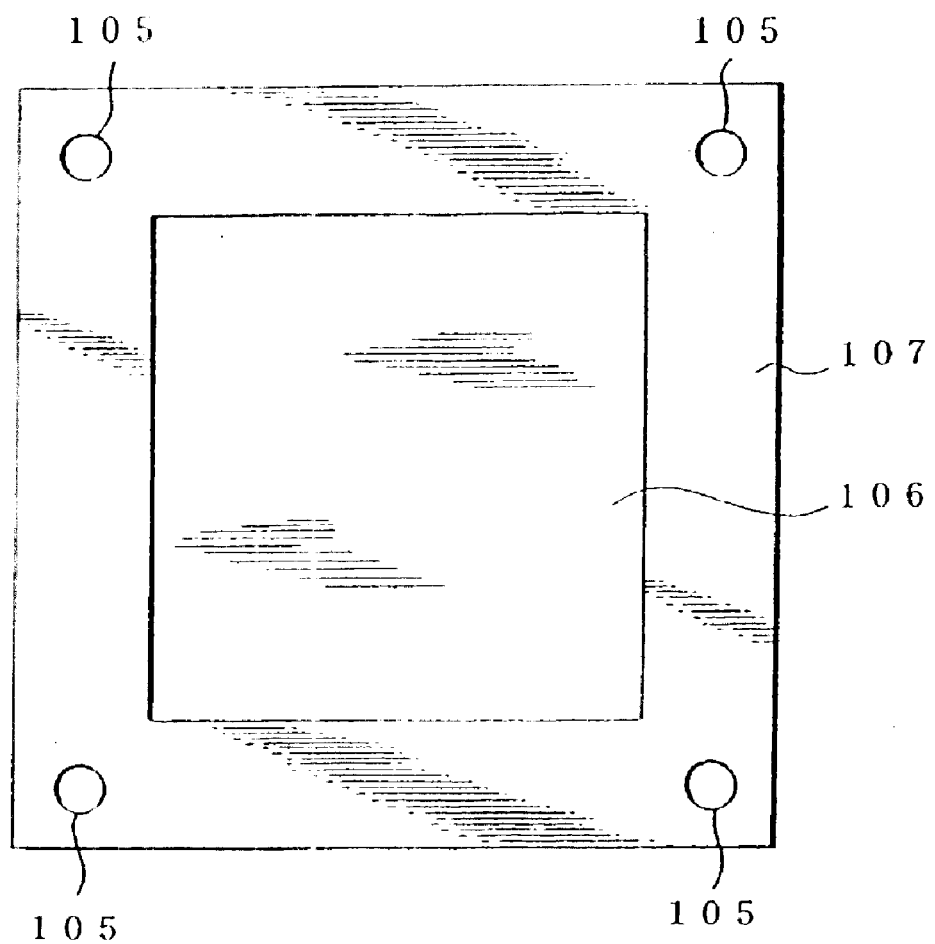
FIG. 6 is a top view schematically illustrating the structure of an MEA with the separator plates in Example 6 of the present invention.
Figure 7:
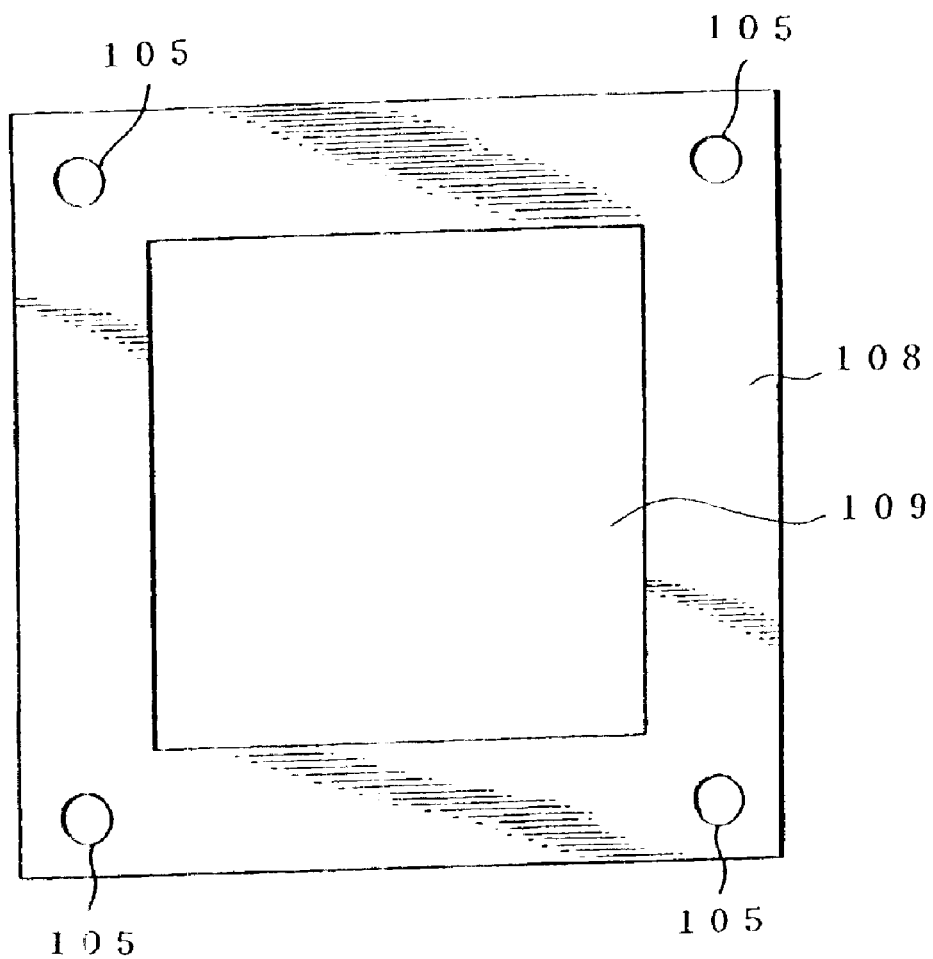
FIG. 7 is a top view schematically illustrating a plate-like molded gasket used in Example 6 of the present invention.

A cathode and an anode having an identical configuration as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte membrane as shown in FIG. 6 to from an electrolyte membrane-electrode assembly (MEA). In FIG. 6, numerals 105, 106, and 107 respectively denote gas manifolds, the electrodes, and the electrolyte membrane. The proton-conductive polymer electrolyte membrane used here was a thin film (25 μm) of perfluorocarbon sulfonic acid represented by Formula (3) given above. As shown in FIG. 7, a plate-like molded gasket seal 108 with apertures 105 and 109 for the manifolds and the electrodes was subsequently formed. The electrolyte membrane of the MEA over the area of the electrodes was interposed between two gasket seals, in such a manner that the electrodes of the MEA were fitted in the apertures 109 for the electrodes formed on the center of the gasket seals 108. Further, the MEA and gasket seals were then interposed between two separator plates that had a shape shown in FIG. 5 and comprised a non-porous carbon material, in such a manner that the gas flow paths formed in the respective separator plates faced each other to form a PEFC. In FIG. 5, numerals 101, 102, 103, and 104 respectively denote the separators, a groove for the gas flow path, a gas inlet manifold, and a gas outlet manifold.

On the both faces of the PEFC, by attaching respective pairs of heater plates, collector plates, insulator plates, and end plates with apertures for the manifolds and clamping the outer-most end plates with bolts, springs, and nuts under a pressure of 20 kg/cm$^2$ per the area of the electrodes, a unit cell structure of the PEFC was constituted.

The plate-like molded gasket seal was obtained by forming the required apertures in a plate of 250 µm in thickness and composed of the polymer compound expressed by Formula (1) given above.

While the PEFC manufactured in the above manner was kept at 75° C., hydrogen gas humidified and heated to have a dew point of 73° C. was fed to one of the electrodes and air humidified and heated to have a dew point of 68° C. was fed to the other of the electrodes. As a result, a cell open voltage of 0.98 V was obtained under the non-loading condition which did not output the electric current to the outside.

Although a test of gas leakage from the gasket seals portion (periphery) of the PEFC was performed, there was no leak detected. The PEFC was subjected to a continuous power generation test under the conditions of a fuel utilization of 80%, an oxygen utilization of 40%, and a current density of 0.3 A/cm$^2$. This PEFC kept a cell voltage of equal to or greater than 0.7 V over 5,000 hours.

PEFCs of comparative examples were prepared with plate-like molded gasket seals, where were respectively comprising a silicone resin expressed by Formula (4)

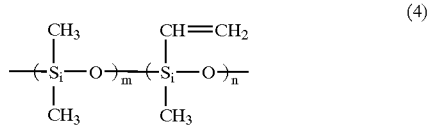

(4)

wherein m and n are integers of not less than 1, and EPDM and polytetrafluoroethylene are employed in place of the polymer compound expressed by Formula (1) given above and were also subjected to the power generation test.

As the result, the PEFC using the gasket seals of the silicon resin showed favorable properties at the initial stage, but a leak of hydrogen gas from the gasket seal was observed after the elapse of approximately 2,000 hours. Denaturation of the silicone gasket was observed in the decomposed PEFC.

The PEFC using gasket seals of EPDM also showed favorable properties at the initial stage, but the generation of the cell voltage suddenly stopped after the elapse of approximately 200 hours. Observation of the decomposed PEFC showed that the EPDM gasket sagged to block the gas flow path.

The PEFC using polytetrafluoroethylene had a leak of hydrogen gas from the gasket even immediately after the assembly.

The polymer compound expressed by Formula (1) and used in this example was obtained by polymerizing the isobutylene oligomer expressed by Formula (2) wherein the number of m was in the range of 56 to 72, 64 on average, and both the functional groups X and Y were allyl groups by irradiation with electron rays under the conditions of the accelerating voltage of 200 keV and the exposed dose of 10 Mrad. The degree of polymerization was approximately 10,000.

The number of repeated isobutylene oligomer units m of less than 56 gave a hard polymer, which required a greater clamping pressure to prevent leaks of hydrogen gas from the gasket seals of the assembled PEFC. The number m of greater than 72, on the other hand, gave an excessively soft polymer, which gave a leak of hydrogen gas from the gasket seal after the elapse of approximately 2,000 hours in the cell performance test.

The irradiation with electron rays was regulated to examine the effect of the degree of polymerization. The degree of polymerization of less than 8,000 resulted in an excessively soft polymer, which resulted in a leak of hydrogen gas from the gasket seal in the cell performance test.

It was confirmed that the polymer compounds that respectively contained acryloyl groups, methacryloyl groups, isocyanate groups, and epoxy groups as the end functional groups and that were cured by the suitable polymerization reactions were also usable. Irradiation with electron rays was used in the case of acryloyl groups and methacryloyl groups as the end functional groups, and urethane bonding was formed by the water content in the case of the isocyanate groups. In the case of the epoxy groups, the polymer was cured with a known amine curing agent, such as ethylenediamine. However, it was confirmed that, like a polymer compound having allyl groups as functional groups, these polymer compounds effectively prevented gas leaks over a long time period, when the number of repeated isobutylene oligomer units m expressed by Formula (2) was adjusted to the range of 56 to 72 and the degree of polymerization was not less than 8,000.

EXAMPLE 7

Acetylene black carbon powder with 25% by weight of platinum particles having an average particle diameter of about 30 angstroms carried thereon was used as a reaction catalyst of the electrodes. A dispersion which was prepared by dispersing perfluorocarbon sulfonic acid powder expressed by Formula (3) in ethyl alcohol was added to a solution of the catalyst powder dispersed in isopropyl alcohol to yield a paste. A catalyst reaction layer was formed on one face of carbon non-woven fabric having a thickness of 250 µm by means of screen printing method with the paste. Quantity control was carried out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness of 25 µm.

As shown in FIG. 7, a gasket-like molded seal which had apertures for the manifolds and the electrodes was molded in the plate-like form. The electrolyte membrane of the MEA over the area of the electrodes was interposed between two gasket seals, such that the electrodes of the MEA were fitted in the apertures for the electrodes formed on the center of the gasket seals. The MEA and gasket seals were then interposed between two separator plates that had a shape shown in FIG. 5 and were composed of a non-porous carbon plate as the material, such that the gas flow paths formed in the respective separator plates faced each other to form a PEFC.

On both faces of the PEFC, by attaching heater plates, collector plates, insulator plates, and end plates with required apertures for the manifolds and clamping the outermost end plates with bolts, springs, and nuts under a pressure of 20 kg/cm$^2$ per the area of the electrodes, a unit cell structure of the PEFC was formed.

The plate-like molded gasket used here was prepared by forming the required apertures in a three-layered structure, where a center layer of a heat-resistant polyethylene terephthalate (PET) resin having a thickness of 150 $\mu$m was interposed between EPDM layers having a thickness of 50 $\mu$m.

While the PEFC manufactured in the above manner was kept at 75° C., hydrogen gas humidified and heated to have a dew point of 73° C. was fed to one of the electrodes and the air humidified and heated to have a dew point of 68° C. was fed to the other of the electrodes. This gave a cell voltage of 0.98 V under a non-loading condition. Although a test of gas leakage from the gasket portion (periphery) of the PEFC was performed, there was no leak detected. The PEFC was subjected to a continuous power generation test under conditions of a fuel utilization of 80%, an oxygen utilization of 40%, and a current density of 0.3 A/cm$^2$. The PEFC kept a cell voltage equal to or greater than 0.7 V over 5,000 hours, enabling power generation without any deterioration of the cell voltage.

EXAMPLE 8

First, acetylene black carbon powder with 25% by weight of platinum particles (average particle diameter of about 30 angstroms) carried thereon was used as a reaction catalyst for the electrodes. A dispersion which was prepared by dispersing perfluorocarbonsulfonic acid powder expressed by Formula (3) in ethyl alcohol was dispersed into a solution of the catalyst powder dispersed in isopropyl alcohol to yield a paste. A catalyst reaction layer was formed on one face of carbon non-woven fabric having a thickness of 250 $\mu$m by means of screen printing with the paste. Quantity control was used out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte membrane as shown in FIG. 6 to form an electrolyte membrane-electrode assembly (MEA). The proton-conductive polymer electrolyte membrane used here was a thin film having thickness of 25 $\mu$m of perfluorocarbonsulfonic acid expressed by Formula (3) given above having a thickness of 25 $\mu$m.

As shown in FIG. 7, a gasket-like molded seal which had apertures for the manifolds and the electrodes was molded into the plate-like form. The electrolyte membrane of the MEA over the area of the electrodes was interposed between two gasket seals, such that the electrodes of the MEA were fitted in the apertures for the electrodes formed on the center of the gasket seals. The MEA and gasket seals were then interposed between two separator plates that had a shape shown in FIG. 5 and were composed of a non-porous carbon plate as the material, such that the gas flow paths formed in the respective separator plates faced each other to constitute a PEFC.

On both faces of the PEFC, by attaching heater plates, collector plates, insulator plates, and end plates with required apertures for the manifolds and clamping the outermost end plates with bolts, springs, and nuts under a pressure of 20 kg/cm$^2$ per the area of the electrodes, a unit cell structure of the PEFC was formed.

The plate-like molded gasket seal used here was prepared by forming the required apertures in a three-layered structure, where a center layer of a heat-resistant polyethylene terephthalate (PET) resin having a thickness of 100 $\mu$m was interposed between layers 75 $\mu$m in thickness composed of the polymer compound expressed by Formula (1) given above. The total thickness of the plate-like molded gasket seal was 250 $\mu$m.

While the PEFC manufactured in the above manner was kept at 75° C., hydrogen gas humidified and heated to have a dew point of 73° C. was fed to one of the electrodes and air humidified and heated to have a dew point of 68° C. was fed to the other of the electrodes. This gave a cell voltage of 0.98 V under a non-loading condition. Although a test of gas leakage from the gasket portion (periphery) of the PEFC was performed, there was no leak detected. The PEFC was subjected to a continuous power generation test under conditions of a fuel utilization of 80%, an oxygen utilization of 40%, and a current density of 0.3 A/cm$^2$. The PEFC kept a cell voltage equal to or greater than 0.7 V over 5,000 hours, enabling power generation without any deterioration of the cell voltage.

EXAMPLE 9

First, acetylene black carbon powder with 25% by weight of platinum particles (average particle diameter of about 30 angstroms) carried thereon was used as a reaction catalyst of the electrodes. A dispersion which was prepared by dispersing perfluorocarbonsulfonic acid powder expressed by Formula (3) in ethyl alcohol was dispersed into a solution of the catalyst powder dispersed in isopropyl alcohol to yield a paste. A catalyst reaction layer was formed on one face of carbon non-woven fabric having a thickness of 250 $\mu$m by means of screen printing with the paste. Quantity control was used out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte membrane as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness of 25 $\mu$m.

Figure 8:
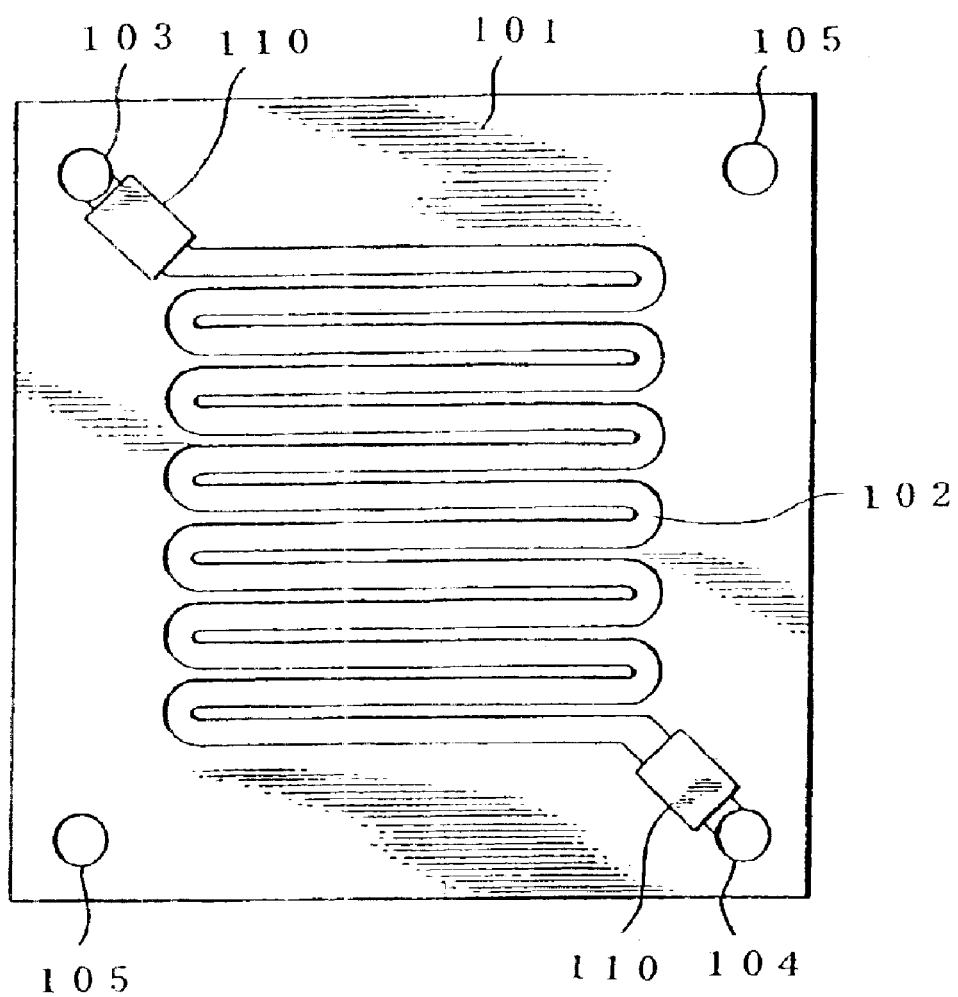
FIG. 8 is a top view schematically illustrating the structure of a separator plate used in Example 9 of the present invention.

FIG. 8 shows the separator plate 101 comprising the non-porous carbon plate and used in this example. A gas flow path bridge 110 made of a non-porous carbon thin plate to make a gas flow path was formed on the upper side of the gas flow path groove 102, through which the gas was introduced from the gas inlet manifold 103 to the surface of the electrode. In the case where the plate-like molded article used in Examples 6 through 8 was used for the gasket seals, the gas flow path bridge shown in FIG. 8 was not required as long as means for preventing the gasket from sagging into the gas flow path was provided by the method of the present invention.

A mixed solution of the reactive oligomer expressed by Formula (2) and cyclohexane (the weight ratio of the mixture was 10:2) was applied on the periphery of the manifolds and the electrodes in the separator plates shown in FIG. 8. The mixed solution was also applied at specific sites 111 and 112 shown in FIG. 9 to a thickness of 300 $\mu$m. The mixed solution was heated at 85° C. for 48 hours to be cured. Before the reactive oligomer expressed by Formula (2) was completely cured, the MEA was interposed between two separator plates having the structure of FIG. 9, such that the gas flow paths formed in the respective separator plates faced each other to form a polymer electrolyte fuel cell stack (PEFC).

On both faces of the PEFC, by attaching heater plates, collector plates, insulator plates, and end plates with required apertures for the manifolds and clamping the outermost end plates with bolts, springs, and nuts under the pressure of 20 kg/cm$^2$ per the area of the electrodes, a unit cell structure of the polymer electrolyte fuel cell was formed.

While the PEFC manufactured in the above manner was kept at 75° C., hydrogen gas humidified and heated to have a dew point of 73° C. was fed to one of the electrodes and air humidified and heated to have a dew point of 68° C. was fed to the other of the electrodes. This gave a cell voltage of 0.98 V under a non-loading condition. Although a test of gas leakage from the gasket portion (periphery) of the PEFC was performed, there was no leak detected. The PEFC was subjected to a continuous power generation test under the conditions of the fuel utilization of 80%, the oxygen utilization of 40%, and the current density of 0.3 A/cm$^2$, but the PEFC kept a cell voltage equal to or greater than 0.7 V over 7,000 hours, enabling power generation without any deterioration of the cell voltage.

The polymer compound expressed by Formula (1) having polyisobutylene as the backbone structure and used in this example was obtained by polymerizing the compound expressed by Formula (2), wherein the repeated isobutylene oligomer units m was in the range of 56 to 72, 64 on average, and both the functional groups X and Y were allyl groups, by adding 0.2% by weight of benzoyl peroxide as a polymerization initiator to the isobutylene oligomer and radical polymerization under the application of heat. After curing, the degree of polymerization of the cured polymer was approximately 9,000. Another known chemical, such as azobisisobutyronitrile, may be used as the polymerization initiator.

The number of repeated isobutylene oligomer units m of less than 56 gave a hard polymer, which resulted in a leak of hydrogen gas from the gasket seal immediately after the assembly of the PEFC. The number m of greater than 72, on the other hand, gave an excessively soft polymer, which resulted in a leak of hydrogen gas from the gasket seal after the elapse of approximately 2,000 hours in the cell performance test.

It was confirmed that the polymer compounds containing, respectively, acryloyl groups, methacryloyl groups, isocyanate groups, and epoxy groups as the end functional groups and cured by the suitable polymerization reactions were also usable. Further, it was confirmed that, like the polymer compound having allyl groups as the functional groups, these polymer compounds effectively prevented gas leaks over a long time period, when the number of repeated isobutylene oligomer units m expressed by Formula (2) was adjusted to the range of 56 to 72 and the degree of polymerization was not less than 8,000.

EXAMPLE 10

Acetylene black carbon powder with 25% by weight of platinum particles (average particle diameter of about 30 angstroms) carried thereon was used as a reaction catalyst of the electrodes. A dispersion which was prepared by dispersing perfluorocarbonsulfonic acid powder expressed by Formula (3) in ethyl alcohol was dispersed into a solution of the catalyst powder dispersed in isopropyl alcohol to yield a paste. A catalyst reaction layer was formed on one face of carbon non-woven fabric having a thickness of 250 $\mu$m by means of screen printing with the paste. Quantity control was used to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness 25 $\mu$m.

Figure 10:
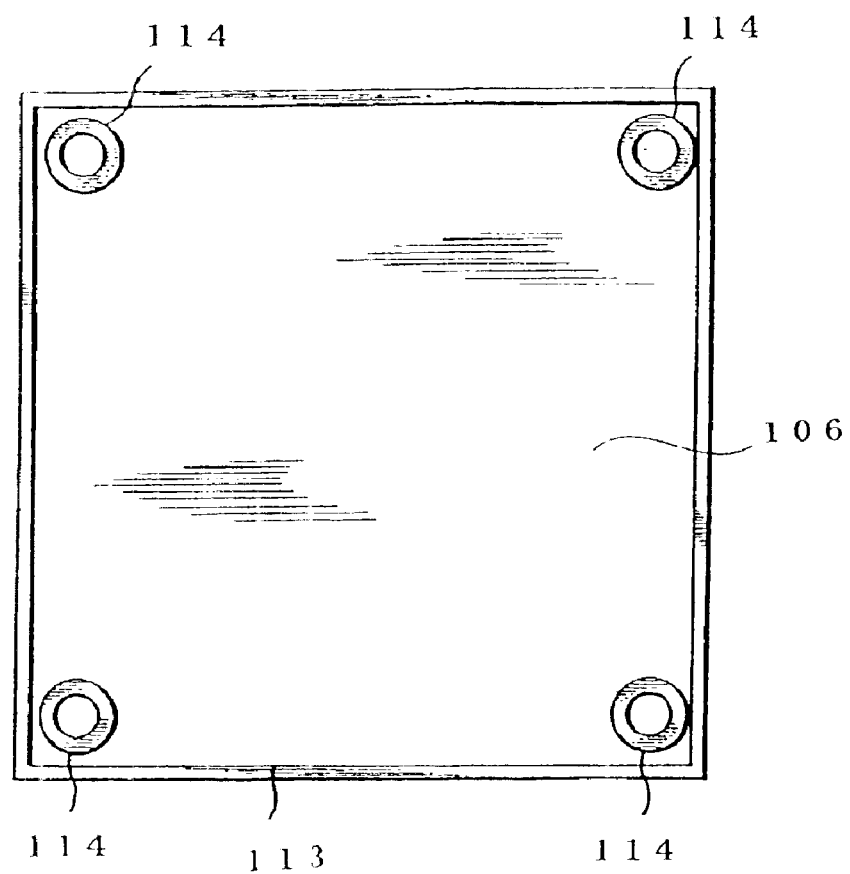
FIG. 10 is a top view schematically illustrating the structure of an MEA in Example 10 of the present invention.
Figure 11:
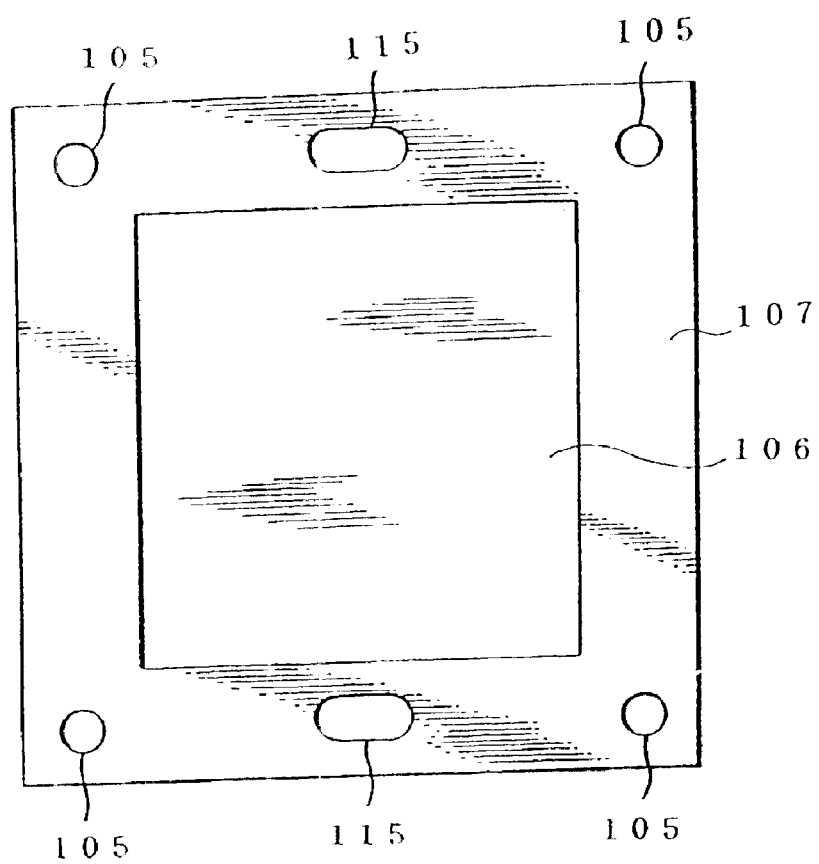
FIG. 11 is a top view schematically illustrating the structure of an MEA in Example 11 of the present invention.

Manifold apertures were punched out of the MEA as shown in FIG. 10 and a mixed solution of the reactive oligomer expressed by Formula (2) and cyclohexane was applied on the inner circumferences 114 of the punched-out manifold apertures and the outer-most circumferences 113 of the electrodes as shown in FIG. 10. Before the mixed solution was completely cured, the MEA was interposed between two separator plates, which had the shape shown in FIG. 5 and were composed of a non-porous carbon material, in such a manner that the gas flow paths formed in the respective separator plates faced each other to form a PEFC. On both faces of the PEFC, by attaching heater plates, collector plates, insulator plates, and end plates with required apertures for the manifolds and clamping the outermost end plates with bolts, springs, and nuts under the pressure of 20 kg/cm$^2$ per the area of the electrodes, a unit cell structure of the polymer electrolyte fuel cell was formed.

While the PEFC manufactured in the above manner was kept at 75° C., hydrogen gas humidified and heated to have a dew point of 73° C. was fed to one of the electrodes and air humidified and heated to have a dew point of 68° C. was fed to the other of the electrodes. This gave a cell voltage of 0.98 V under the non-loading condition. Although a test of gas leakage from the gasket portion (periphery) of the PEFC was performed, there was no leak detected. The PEFC was subjected to a continuous power generation test under conditions of fuel utilization of 80%, an oxygen utilization of 40%, and a current density of 0.3 A/cm$^2$. The PEFC kept a cell voltage equal to or greater than 0.7 V over 7,000 hours, enabling power generation without any deterioration of the cell voltage.

The polymer compound expressed by Formula (1) used in this example was obtained by polymerizing the compound expressed by Formula (2), wherein the repeated isobutylene oligomer units m was in the range of 56 to 72, 64 on average, and both the functional groups X and Y were allyl groups, by adding 0.3% by weight of benzoyl peroxide as a polymerization initiator to the isobutylene oligomer and through radical polymerization under the application of heat of 85° C. for 48 hours. After curing, the degree of polymerization of the cured polymer was approximately 11,000. Another known chemical, such as azobisisobutyronitrile, may be used as the polymerization initiator.

It was found that dispersion of an electron conductive agent in the polymer compound expressed by Formula (1) having polyisobutylene as the backbone structure improved the output properties of the resulting fuel cell. The seal portion was obtained by mixing the polymerizing compound expressed by Formula (2), wherein the number of repeated isobutylene oligomer units m was in the range of 56 to 72, 64 on average and allyl groups were contained as both the functional groups X and Y; cyclohexane, acetylene black, and benzoyl peroxide were contained as a polymerization initiator at 100:20:5:1 (weight ratio) and radical polymerization was carried out under the application of heat.

While the PEFC manufactured in the above manner was kept at 75° C., hydrogen gas humidified and heated to have a dew point of 73° C. was fed to one of the electrodes and a air humidified and heated to have a dew point of 68° C. was fed to the other of the electrodes. This gave a cell voltage of 0.98 V under the non-loading condition. Although a test of gas leakage from the gasket portion (periphery) of the PEFC was performed, there was no leak detected. The PEFC was subjected to a continuous power generation test under the conditions of the fuel utilization of 80%, the oxygen utilization of 40%, and the current density of 0.3 A/cm$^2$. This PEFC kept a cell voltage equal to or greater than V over 5,000 hours, enabling power generation without any deterioration of the cell voltage.

EXAMPLE 11

Acetylene black carbon powder with 25% by weight of platinum particles having an average particle diameter of about 30 angstroms carried thereon was used as a reaction catalyst of the electrodes. A dispersion which was prepared by dispersing perfluorocarbonsulfonic acid powder expressed by Formula (3) in ethyl alcohol was mixed into a solution of the catalyst powder dispersed in isopropyl alcohol to yield a paste. A catalyst reaction layer was formed on one face of carbon non-woven fabric having a thickness of 250 μm by means of a screen printing method with the paste. Quantity control was carried out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane 107, which had a little greater area than that of the electrodes, and joined together across the electrolyte membrane by hot press, such that the printed catalyst layers of the electrodes were in contact with the electrolyte membrane as shown in FIG. 6 to form an electrolyte membrane-electrode 106 assembly (MEA). The proton-conductive polymer electrolyte membrane used here was a thin film of perfluorocarbonsulfonic acid expressed by Formula (3) given above having a thickness of 25 μm.

Figure 12:
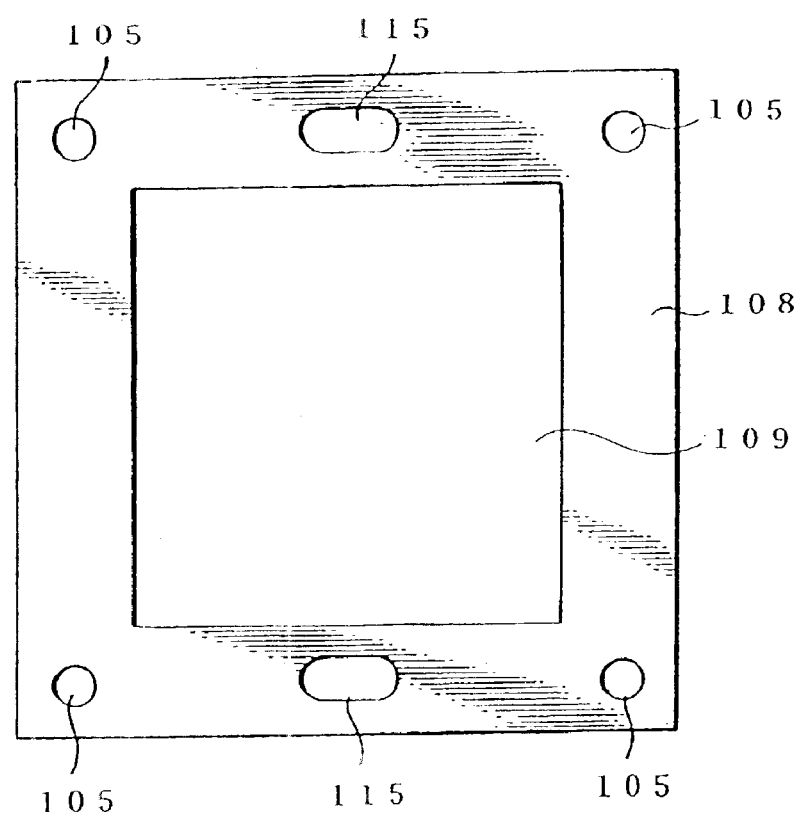
FIG. 12 is a top view schematically illustrating the structure of a plate-like molded gasket used in Example 11 of the present invention.

The electrolyte membrane of the MEA over the area of the electrodes was interposed between two plate-like molded gasket seals, such that the electrodes of the MEA were fitted in rectangular apertures for the electrodes formed on the center of the plate-like molded gasket seals having apertures for the electrodes, apertures for cooling water, and apertures for manifolds 115 shown in FIG. 12. The MEA and the plate-like molded gasket seals were then interposed between two separator plates that each respectively had a gas flow path shown in FIG. 13, such that the gas flow paths formed in the respective separator plates faced each other to form a PEFC.

The separator plate was prepared by mixing expanded graphite powder with the polymer compound expressed by Formula (1) and press-molding the mixture. The separator plate had the gas flow path shown in FIG. 13 on one face and a groove for the flow path of cooling water on the opposite face.

The plate-like molded gasket used here was prepared by forming the required apertures in a three-layered structure (250 μm in thickness), where a center layer of a heat-resistant polyethylene terephthalate (PET) resin having a thickness of 100 μm was interposed between layers 75 μm in thickness composed of the polymer compound expressed by Formula (1) given above.

Figure 14:
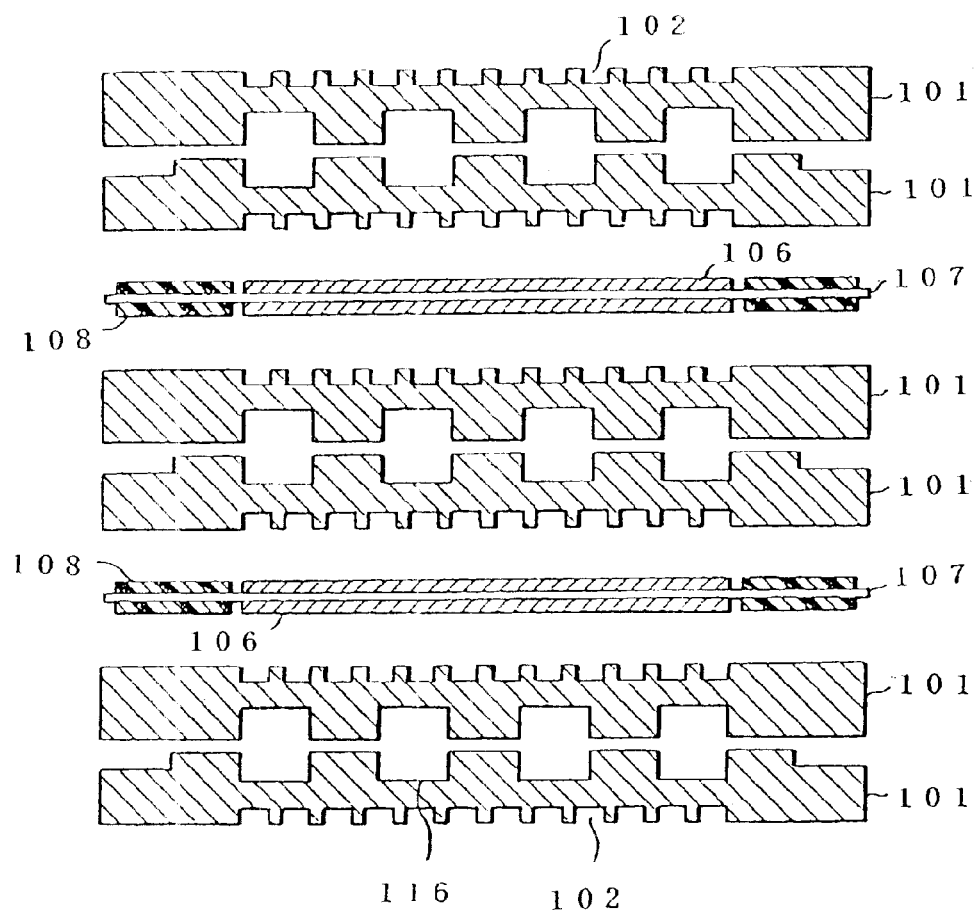
FIG. 14 is a sectional view schematically illustrating a PEFC in Example 11 of the present invention.

50 PEFCs of the above unit cell structure were successively laid one upon another to form a cell laminate as schematically illustrated in FIG. 14. The polymer compound expressed by Formula (1) was used for the sealing portions around a cooling water flow path 116. On both faces of the cell laminate, by attaching collector plates, insulator plates, and end plates with required apertures for the gas and cooling water manifolds and clamping the outer-most end plates with bolts, springs, and nuts under the pressure of 20 kg/cm$^2$ per the area of the electrodes, a stack of PEFCs was formed. While the PEFC stack was kept at 75° C. under the flow of cooling water, hydrogen gas humidified and heated to have a dew point of 73° C. was fed to the anode and air humidified and heated to have a dew point of 68° C. was fed to the cathode. This gave a cell voltage of 49 V under the non-loading condition. There were no gas leaks detected from the gasket seals (periphery) of the PEFC stack. The PEFC stack was subjected to a continuous power generation test under conditions of a fuel utilization of 80%, an oxygen utilization of 40%, and a current density of 0.7 A/cm$^2$. This PEFC stack kept a cell voltage equal or greater than 31 V over 5,000 hours, enabling power generation without any deterioration of the cell voltage.

EXAMPLE 12

Acetylene black carbon powder with 25% by weight of platinum particles having an average particle diameter of about 30 angstrom carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was mixed to yield a paste. A catalyst reaction layer was formed on one face of carbon non-woven fabric having a thickness of 250 μm by means of a screen printing method with the paste as the raw material. Quantity control was carried out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness of 25 μm.

The electrolyte membrane of the MEA over the area of the electrodes was interposed between two plate-like molded gasket seals, such that the electrodes of the MEA were fitted in rectangular apertures for the electrodes formed on the center of the plate-like molded gasket seals having apertures for the electrodes, apertures for cooling water, and apertures for manifolds shown in FIG. 12. The MEA and the plate-like molded gasket seals were then interposed between two separator plates that each respectively had a gas flow path shown in FIG. 13, such that the gas flow paths formed in the respective separator plates faced each other to form a PEFC.

The separator plate was prepared by making a porous sheet of expanded graphite powder, which had been molded in advance, impregnated with the polymer compound, which was expressed by Formula (1) and had polyisobutylene as the backbone structure, and press-molding the polymer-impregnated porous sheet. The separator plate had the gas flow path shown in FIG. 13 on one face and a groove for the flow path of cooling water on the opposite face.

The plate-like molded gasket used here was prepared by forming the required apertures in a three-layered structure, where a center layer of a heat-resistant polyethylene terephthalate (PET) resin having a thickness of 100 μm was interposed between layers (sheets) 75 μm in thickness composed of the polymer compound expressed by Formula (1) given above.

The polymer compound expressed by Formula (1) and used in this example had the same structure and was manufactured by the same method as Example 1.

50 PEFCs of the above unit cell structure were successively laid one upon another to form a cell laminate as schematically illustrated in FIG. 14. The polymer compound expressed by Formula (1) was used for the sealing portions around a cooling water flow path. On both faces of the cell laminate, by attaching collector plates, insulator plates, and end plates with required apertures for the gas and cooling water manifolds and clamping the outer-most end plates with bolts, springs, and nuts under the pressure of 20 kg/cm$^2$ per the area of the electrodes, a PEFC stack was formed.

While the PEFC stack was kept at 75° C. under the flow of cooling water, hydrogen gas humidified and heated to have a dew point of 73° C. was fed to the anode and air humidified and heated to have a dew point of 68° C. was fed to the cathode. This gave a cell voltage of 49 V under the non-loading condition. There were no gas leaks detected from the gasket seals (periphery) of the PEFC stack. The PEFC stack was subjected to a continuous power generation test under the conditions of a fuel utilization of 80%, an oxygen utilization of 40%, and a current density of 0.7 A/cm$^2$. This PEFC stack kept a cell voltage of equal or greater than 31 V over 5000 hours. This PEFC stack enabled power generation without any deterioration of the cell voltage.

EXAMPLE 13

Acetylene black carbon powder with 25% by weight of platinum particles having an average particle diameter of about 30 angstroms carried thereon was used as a reaction catalyst of the electrodes. A dispersion which was prepared by dispersing perfluorocarbonsulfonic acid powder expressed by Formula (3) in ethyl alcohol was mixed into a solution of the catalyst powder dispersed in isopropyl alcohol to yield a paste. A catalyst reaction layer was formed on one face of carbon non-woven fabric having a thickness of 250 μm by means of a screen printing method with the paste as the raw material. Quantity control was carried out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte membrane as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness of 25 μm.

The electrolyte membrane of the MEA over the area of the electrodes was interposed between two plate-like molded gasket seals, such that the electrodes of the MEA were fitted in rectangular apertures for the electrodes formed on the center of the plate-like molded gasket seals having apertures for the electrodes, apertures for cooling water, and apertures for manifolds shown in FIG. 12. The MEA and the plate-like molded gasket seals were then interposed between two separator plates that each respectively had a gas flow path shown in FIG. 13, such that the gas flow paths formed in the respective separator plates faced each other to form a PEFC.

The separator plate was prepared by press-molding a porous sheet of expanded graphite powder, making the surface of the molded sheet with a gas flow path water-repellent, impregnating the porous sheet with a mixed solution of the reactive oligomer expressed by Formula (2) and cyclohexane (mixing weight ratio of 10 to 2), and heating the impregnated porous sheet at 85° C. for 48 hours. The separator plate had the gas flow path shown in FIG. 13 on one face and a groove for the flow path of cooling water on the opposite face. Water repellency was obtained by heating an applied layer of an aqueous dispersion of tetrafluoroethylene-hexafluoropropylene copolymer at approximately 350° C.

The plate-like molded gasket used here was prepared by forming the required apertures in a three-layered structure, where a center layer of a heat-resistant polyethylene terephthalate (PET) resin having a thickness of 100 μm was interposed between layers (sheets) 75 μm in thickness composed of the polymer compound expressed by Formula (1) given above.

50 PEFCs of the above unit cell structure were successively laid one upon another to form a cell laminate as schematically illustrated in FIG. 14. The polymer compound expressed by Formula (1) was used for the sealing portions around a cooling water flow path. The cell laminate was interposed between respective pairs of collector plates, insulator plates, and end plates with required apertures for the gas and cooling water manifolds, and the outer-most end plates with bolts, springs, and nuts were clamped under a pressure of 20 kg/cm$^2$ per the area of the electrodes to yield a stack of PEFCs.

While the PEFC stack was kept at 75° C. under the flow of cooling water, hydrogen gas humidified and heated to have a dew point of 73° C. was fed to the anode and air humidified and heated to have a dew point of 68° C. was fed to the cathode. This gave a cell voltage of 49 V under the non-loading condition. There were no gas leaks detected from the gasket seals (periphery) of the PEFC stack. The PEFC stack was subjected to a continuous power generation test under conditions of a fuel utilization of 80%, an oxygen utilization of 40%, and a current density of 0.7 A/cm$^2$. This PEFC stack kept a cell voltage greater than or equal to 31 V over 5,000 hours, enabling power generation without any deterioration of the cell voltage.

The polymer compound expressed by Formula (1) and used in this example was obtained by polymerizing the compound expressed by Formula (2), wherein the number of repeated isobutylene oligomer units m is in the range of 56 to 72, 64 on average, and allyl groups were contained as both the functional groups, by adding 0.2% by weight of benzoyl peroxide as a polymerization initiator to the isobutylene oligomer and through radical polymerization under the application of heat. The degree of polymerization of the cured polymer was approximately 9,000.

EXAMPLE 14

Acetylene black carbon powder with 25% by weight of platinum particles having an average particle diameter of about 30 angstroms carried thereon was used as a reaction catalyst of the electrodes. A dispersion which was prepared by dispersing perfluorocarbonsulfonic acid powder expressed by Formula (3) in ethyl alcohol was mixed into a solution of the catalyst powder dispersed in isopropyl alcohol to yield a paste. A catalyst reaction layer was formed on one face of carbon non-woven fabric having a thickness of 250 μm by means of a screen printing method with the paste as the raw material. Quantity control was carried out to make the quantity of platinum included in the resulting electrode equal to 0.5 mg/cm$^2$ and the quantity of perfluorocarbonsulfonic acid equal to 1.2 mg/cm$^2$.

A cathode and anode having an identical configuration, as discussed above, were placed on the center of a proton-conductive polymer electrolyte membrane, which had a little greater area than that of the electrodes, and joined together across the electrolyte membrane by hot press, such that the printed catalyst layers of the electrodes were in contact with the electrolyte membrane as shown in FIG. 6 to form an electrolyte membrane-electrode assembly (MEA). The proton-conductive polymer electrolyte membrane used here was a thin film of perfluorocarbonsulfonic acid expressed by Formula (3) given above having a thickness of 25 μm.

Figure 15:
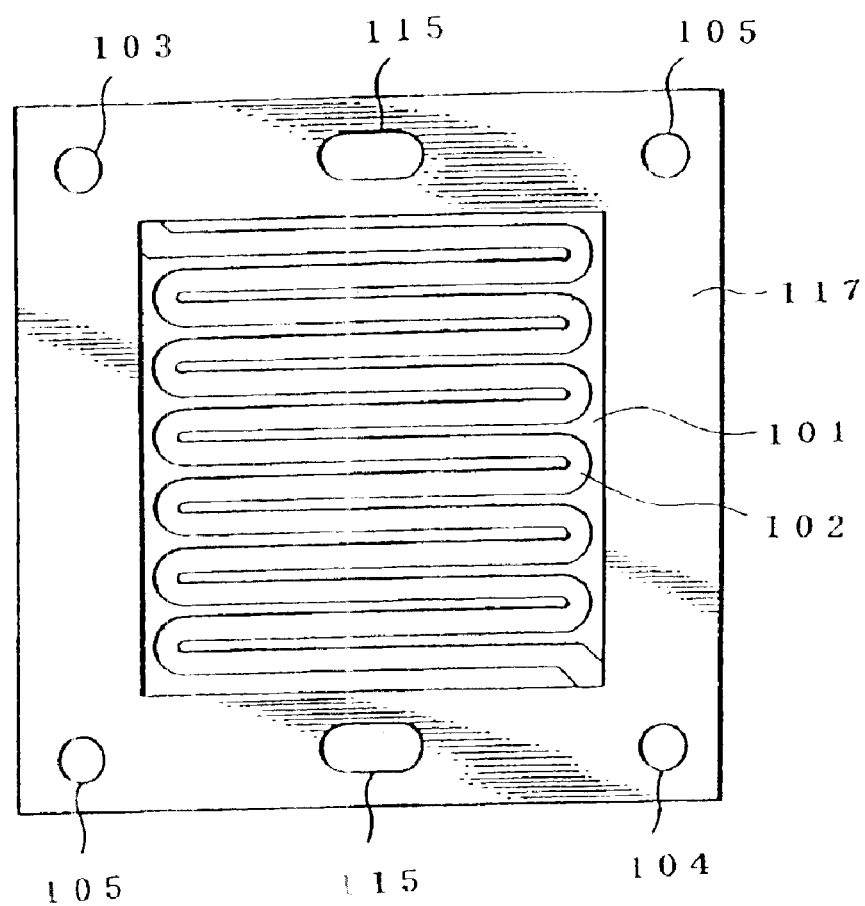
FIG. 15 is a top view schematically illustrating the structure of a separator plate used in Example 14 of the present invention.

The MEA was interposed between two separator plates having gas flow paths shown in FIG. 15, such that the electrodes of the MEA respectively face the gas flow paths formed in the separator plates to form a PEFC.

The central portion of the separator plate, which was in contact with the electrode, was composed of SUS316, while the peripheral portion of the separator plate, which was in contact with the electrolyte membrane, had gas and cooling water manifolds, and worked to seal the flows of gas and cooling water, was composed of the polymer compound expressed by Formula (1). The separator plate had the gas flow path shown in FIG. 15 on one face and a groove for the flow path of cooling water on the opposite face. This arrangement enabled the peripheral portion of the separator plate to function as the gasket seals, thereby not requiring separate gaskets.

Figure 16:
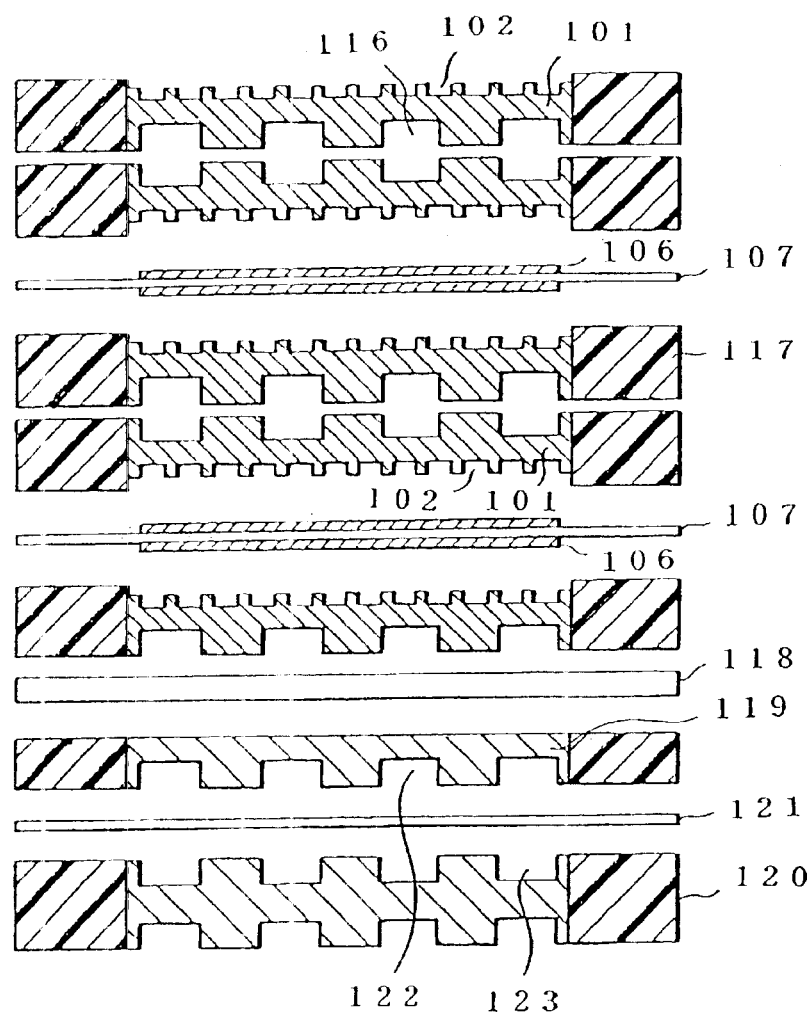
FIG. 16 is a sectional view schematically illustrating a PEFC including a layered internal humidifying unit in Example 14 of the present invention.

50 PEFCs of the above unit cell structure were successively laid one upon another to form a cell laminate as schematically illustrated in FIG. 16. Collector plates 118 having required apertures for the gas and cooling water manifolds were placed across the cell laminate, and an internal humidifier was placed via a partition plate 119 outside one of the collector plates 118. The internal humidifier had a polymer electrolyte membrane 121 on its center, where the discharge of cooling water flowed on one face of the polymer electrolyte membrane, and the supply of gas flowed on the other face to enable the supply of gas to be heated and humidified simultaneously.

In the structure shown in FIG. 16, ten of such internal humidifiers were successively laid one upon another. FIG. 16, numerals 122 and 123 respectively represent a groove for a flow path of the discharge of cooling water and a groove for a gas inlet flow path. The polymer compound expressed by Formula (1) and placed around the internal humidifiers functions as the gasket seal of the gas and cooling water and, like the separator plates, this arrangement does not require separate gaskets.

The cell laminate was interposed between respective pairs of insulator plates and end plates with required apertures for the gas and cooling water manifolds, and the outer-most end plates were clamped with bolts, springs, and nuts under a pressure of 20 kg/cm$^2$ per the area of the electrodes to yield a PEFC stack.

While the PEFC stack was kept at 75° C. under the flow of cooling water, dry hydrogen gas was humidified and heated by an internal humidifier and fed to the anode, and dry air was humidified and heated by an internal humidifier and fed to the cathode. This gave a cell voltage of 49 V under the non-loading condition. There were no gas leaks detected from the gasket seals (periphery) of the PEFC stack. The PEFC stack was subjected to a continuous power generation test under the conditions of a fuel utilization of 80%, an oxygen utilization of 40%, and a current density of 0.7 A/cm$^2$. This PEFC stack kept a cell voltage equal to or greater than 31 V over 5,000 hours. This PEFC stack enabled power generation without any deterioration of the cell voltage.

The polymer compound expressed by Formula (1) and used in this example was obtained by polymerizing the compound expressed by Formula (2), wherein the number of repeated isobutylene oligomer units m was in the range of 56 to 72, 64 on average, and allyl groups were contained as both the functional groups X and Y, by adding 0.2% by weight of benzoyl peroxide as a polymerization initiator to the isobutylene oligomer and carrying out radical polymerization at 85 ° C. for 48 hours. The degree of polymerization of the cured polymer was approximately 9,000.

INDUSTRIAL APPLICABILITY

The present invention provides a polymer electrolyte fuel cell stack having excellent durability and productivity. Gasket sealing portions, a sealing portion for cooling water, and sealing portions for water and gas in an internal humidifying unit are formed from a polymer compound that has polyisobutylene as the backbone structure. This arrangement gives a polymer electrolyte fuel cell stack having high reliability.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A polymer electrolyte fuel cell stack comprising a plurality of unit cells, each unit cell comprising a polymer electrolyte membrane, a pair of electrodes arranged across said polymer electrolyte membrane and having respective catalytic reaction layers, a first separator having means for feeding a supply of fuel gas containing hydrogen gas to one of said electrodes, and a second separator having means for feeding a supply of oxidant gas to the other of said electrodes, and a manifold for feeding at least one of the supply of fuel gas and the supply of oxidant gas to the respective electrodes, the manifold being disposed on a side face of the stack of unit cells, and a sealing portion being disposed inside of the manifold, wherein said sealing portion is constituted by a polymer compound expressed by formula (1):

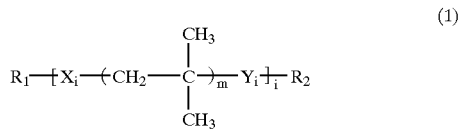

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and i is an integer of not less than 1 and represents the degree of polymerization.

2. The polymer electrolyte fuel cell stack in accordance with claim 1, wherein at least one of the first and second separators has a cooling means which includes a sealing portion.

3. The polymer electrolyte fuel cell stack in accordance with claim 1, further comprising a humidifying unit that enables heat exchange between a flow of cooling water discharged from the polymer electrolyte fuel cell stack and a flow of fuel gas fed to the polymer electrolyte fuel cell stack and that simultaneously carries out heating and humidifying, the humidifying unit having a sealing portion.

4. The polymer electrolyte fuel cell stack in accordance with claim 1, wherein the polymerizable functional groups $X_i$ and $Y_i$ in said formula (1) are independently selected from an allyl group, an acryloyl group, a methacryloyl group, an isocyanate group, and an epoxy group.

5. The polymer electrolyte fuel cell stack in accordance with claim 1, wherein the number of repeated isobutylene oligomer units m in said formula (1) ranges from 56 to 72.

6. The polymer electrolyne fuel cell stack in accordance with claim 1, wherein the degree of polymerization is not less than 8000.

7. A polymer electrolyte fuel cell stack comprising a plurality of unit cells, each unit cell comprising a polymer electrolyte membrane, a pair of electrodes arranged across said polymer electrolyte membrane and having respective catalytic reaction layers, a first separator having means for feeding a supply of fuel gas containing hydrogen gas to one of said electrodes, and a second separator having means for feeding a supply of oxidant gas to the other of said electrodes, and a manifold for feeding at least one of the supply of fuel gas and the supply of oxidant gas to the respective electrodes, the manifold being disposed on a side face of the stack of unit cells, and a sealing portion being disposed inside of the manifold, wherein said separator is constituted by a carbon material or a metal material and a polymer compound expressed by formula (1):

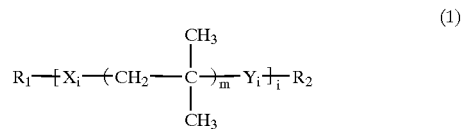

wherein $R_1$ and $R_2$ are non-functional end groups; $X_i$ and $Y_i$ are independently polymerizable functional groups and form crosslinking points after polymerization; m is an integer of not less than 1 and represents a number of repeated isobutylene oligomer units; and i is an integer of not less than 1 and represents the degree of polymerization.

8. The polymer electrolyte fuel cell stack in accordance with claim 1, wherein at least a portion of the sealing portion comprises plural layers.

9. A polymer electrolyte fuel cell stack comprising a plurality of unit cells, each unit cell comprising a polymer electrolyte membrane, a pair of electrodes arranged across said polymer electrolyte membrane and having respective catalytic reaction layers, a first separator having means for feeding a supply of fuel gas containing hydrogen gas to one of said electrodes, and a second separator having means for feeding a supply of oxidant gas to the other of said electrodes, and a manifold for feeding at least one of the supply of fuel gas and the supply of oxidant gas to the respective electrodes, the manifold being disposed on a side face of the stack of unit cells, and a sealing portion being disposed inside of the manifold, wherein the sealing portion has a thin-layered structure, where a heat-resistant hard resin layer is interposed between a pair of elastic resin layers.

* * * * *